United States Patent
Wang et al.

(10) Patent No.: US 9,739,961 B2
(45) Date of Patent: Aug. 22, 2017

(54) PLUGGABLE OPTICAL COMMUNICATIONS MODULE AND SYSTEM WITH ALIGNED ESA AXIS

(71) Applicant: Avago Technologies General IP (Singapore) Pte. Ltd., Singapore (SG)

(72) Inventors: Tak Kui Wang, San Jose, CA (US); Chung-Yi Su, Fremont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/675,625

(22) Filed: Mar. 31, 2015

(65) Prior Publication Data

US 2016/0291270 A1    Oct. 6, 2016

(51) Int. Cl.
*G02B 6/42* (2006.01)

(52) U.S. Cl.
CPC ........... *G02B 6/4277* (2013.01); *G02B 6/428* (2013.01); *G02B 6/4278* (2013.01)

(58) Field of Classification Search
CPC ...... G02B 6/4277; G02B 6/42; G02B 6/4278; G02B 6/428
See application file for complete search history.

(56) References Cited

U.S. PATENT DOCUMENTS

| | | | |
|---|---|---|---|
| 6,832,856 B2* | 12/2004 | Chiu | G02B 6/3825 385/139 |
| 7,111,994 B2 | 9/2006 | Schwiebert et al. | |
| RE41,147 E * | 2/2010 | Pang | G02B 6/4201 385/92 |
| 7,972,176 B2* | 7/2011 | Burris | H01R 9/0521 439/584 |
| 7,978,974 B2 | 7/2011 | Togami et al. | |
| 8,351,794 B2* | 1/2013 | Meadowcroft | G02B 6/4246 257/675 |
| 8,414,309 B2* | 4/2013 | Meadowcroft | G02B 6/4214 439/71 |
| 2006/0140549 A1* | 6/2006 | Sabbatino | G02B 6/4201 385/89 |
| 2011/0268397 A1* | 11/2011 | Meadowcroft | G02B 6/4214 385/94 |
| 2016/0291270 A1* | 10/2016 | Wang | G02B 6/4277 |

* cited by examiner

*Primary Examiner* — Andrew Jordan

(57) ABSTRACT

An optical communications system and a pluggable optical communications module for use in the system are provided. The configuration of the pluggable optical communications module is such that no optical turn in any light path is required. Embodiments of the optical communications module include an EMI shielding solution and an electrical interface for electrically interfacing an electrical subassembly (ESA) of the module with a system printed circuit board (PCB) in a way that obviates the need for an optical turn.

22 Claims, 20 Drawing Sheets

PLUGGABLE OPTICAL COMMUNICATIONS MODULE AND SYSTEM WITH ALIGNED ESA AXIS

TECHNICAL FIELD

The invention relates to optical communications modules. More particularly, the invention relates to a pluggable optical communications module and system.

BACKGROUND

A variety of optical communications modules exist for transmitting and/or receiving optical data signals over optical waveguides (e.g., optical fibers). Optical communications modules include optical receiver modules, optical transmitter modules and optical transceiver modules. Optical receiver modules have one or more receive channels for receiving one or more optical data signals over one or more respective optical waveguides. Optical transmitter modules have one or more transmit channels for transmitting one or more optical data signals over one or more respective optical waveguides. Optical transceiver modules have one or more transmit channels and one or more receive channels for transmitting and receiving respective optical transmit and receive data signals over respective transmit and receive optical waveguides. For each of these different types of optical communications modules, a variety of designs and configurations exist.

In order to meet ever-increasing demands for higher information bandwidth, state-of-the-art digital communication switches, servers, and routers often use multiple rows of optical communications modules arranged in very close proximity to one another to increase module density. To be a commercially fungible product, the optical communications modules generally need to have basic dimensions and mechanical functionality that conform to an industry standard Multi-Source Agreement (MSA). Of course, many optical communications module designs that comply with and add value beyond the basic mechanical functionally set forth in the MSA are possible.

One known optical transceiver module design that complies with such an MSA is the Small Form-Factor Pluggable (SFP) optical communications module. SFP optical communications modules are designed to mate with an opening formed in a cage. The module housing has one or more receptacles configured to mate with one or more respective optical connectors that terminate ends of respective optical fiber cables. The most common type of optical connector used with SFP optical transceiver modules is called the LC optical connector.

When an SFP or similar type of optical transceiver module is in a stored position inside of a cage, catches formed in opposite sides of the module housing engage respective latches formed in opposite sides of the cage to prevent the module housing from inadvertently coming out of the cage opening. The SFP module housing is typically a two-piece part comprising an upper metal housing portion and a lower metal housing portion that are secured to one another. Module housings of this type typically include a pair of cage latch stops formed on opposite outer side walls of the module housing that engage the pair of latches formed on opposite side walls of the cage to secure the module housing to the cage when the module housing is fully inserted into the cage. With these types of module designs, a relatively complex latching/delatching mechanism is mechanically coupled to the module housing and is operable to temporarily deform the latches of the cage to delatch, or disengage, the latches of the cage from the latch stops of the module housing. Once the module housing has been delatched from the cage, the module can be extracted from the cage.

One issue that needs to be addressed when designing optical communications modules is electromagnetic interference (EMI) shielding. In most optical communications modules, the receptacle that receives the optical connector disposed on the end of the optical fiber cable constitutes an EMI open aperture that allows EMI to escape from the module housing. The Federal Communications Commission (FCC) has set standards that limit the amount of electromagnetic radiation that may emanate from unintended sources. For this reason, a variety of techniques and designs are used to shield EMI open apertures in module housings in order to limit the amount of EMI that passes through the apertures. Various metal shielding designs and resins that contain metallic material have been used to cover areas from which EMI may escape from the housings. So far, such techniques and designs have had only limited success, especially with respect to optical communications modules that transmit and/or receive data at very high data rates (e.g., 10 gigabits per second (Gbps) and higher).

For example, EMI collars are often used with pluggable optical communications modules to provide EMI shielding. The EMI collars in use today vary in construction, but generally include a band portion that is secured about the exterior of the module housing and spring fingers having proximal ends that attach to the band portion and distal ends that extend away from the proximal ends. The spring fingers are periodically spaced about the collar and have folds in them near their distal ends that direct the distal ends inwardly toward the module housing. The distal ends make contact with the upper and lower metal housing portions at periodically-spaced points on the housing. At the locations where the folds occur near the distal ends of the spring fingers, the outer surfaces of the spring fingers are in contact with the inner surface of the cage at periodically spaced contact points along the inner surface of the cage. Such EMI collar designs are based on Faraday cage principles.

The amount of EMI that passes through an EMI shielding device increases with the largest dimension of the largest EMI open aperture of the EMI shielding device. Therefore, EMI shielding devices such as EMI collars and other devices are designed to ensure that there is no open aperture that has a dimension that exceeds the maximum allowable EMI open aperture dimension associated with the frequency of interest. For example, in the known EMI collars of the type described above, the spacing between the locations at which the outer surfaces of the spring fingers come into contact with the inner surface of the cage should not exceed one quarter wavelength of the frequency of interest that is being attenuated. Even greater attenuation of the frequency of interest can be achieved by making the maximum EMI open aperture dimension significantly less than one quarter of a wavelength, such as, for example, one eighth or one tenth of a wavelength. However, the ability to decrease this spacing using currently available manufacturing techniques is limited. In addition, as the frequencies of optical communications modules increase, this spacing needs to be made smaller in order to effectively shield EMI, which becomes increasingly difficult or impossible to achieve at very high frequencies.

The metal housing and the latching/delatching mechanism of the known SFP module described above contribute significantly to the cost of the SFP module. The metal housing is needed because it is part of the EMI shielding solution. In addition, the cage consumes a large amount of space in the system, which leads to reduced mounting density and reduced bandwidth. A need exists for a pluggable optical communications module configuration and system that obviate the need for the metal housing and the latching/delatching mechanism, thereby reducing costs, while continuing to provide EMI shielding and pluggability.

DETAILED DESCRIPTION OF AN ILLUSTRATIVE EMBODIMENT

Figure 1:
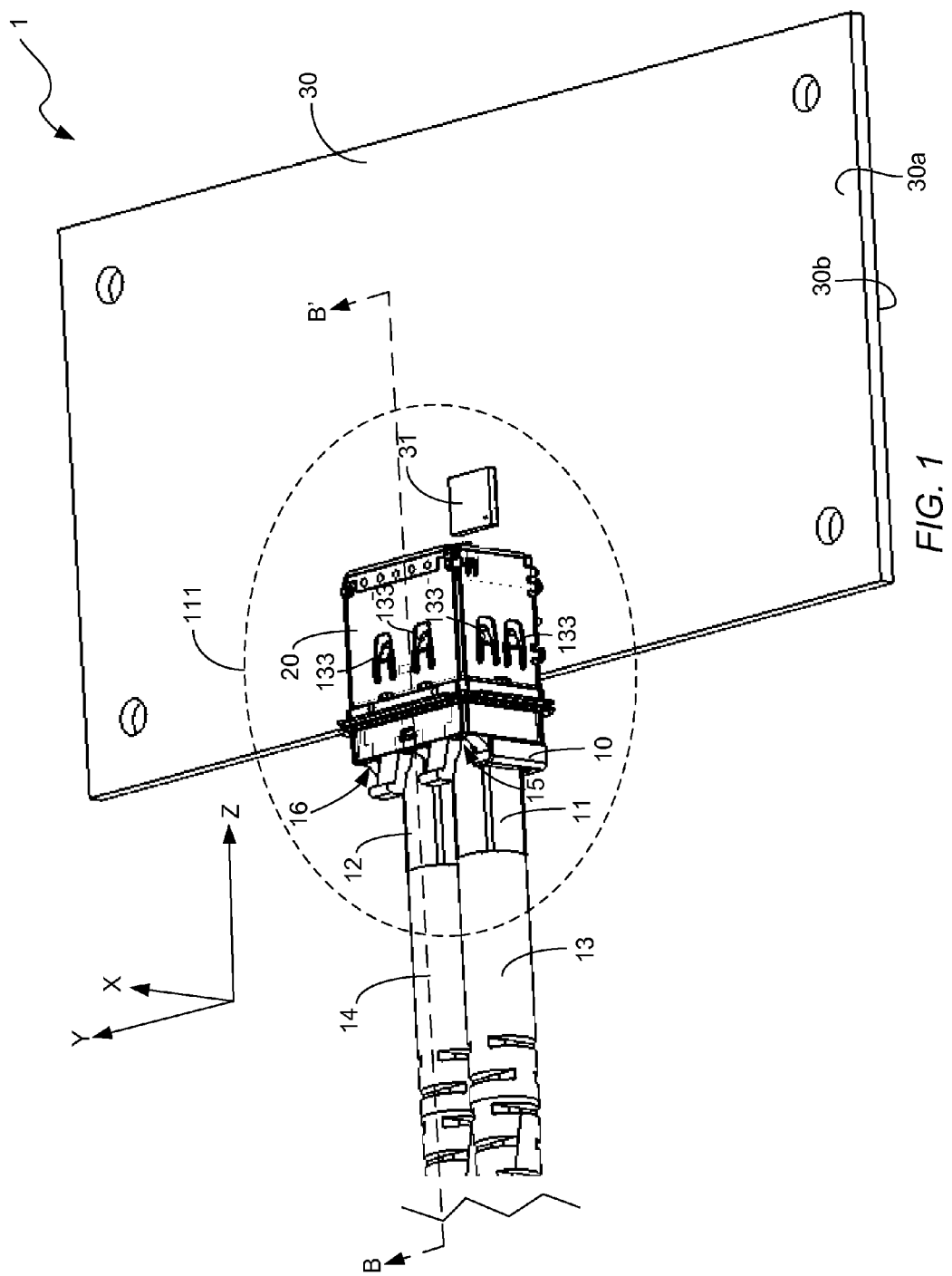
FIG. 1 illustrates a top perspective view of an optical communications system in accordance with an illustrative embodiment.

In accordance with illustrative, or exemplary, embodiments described herein, an optical communications system and a pluggable optical communications module for use in the system are provided. The pluggable optical communications module has a module body that is made of plastic and has an EMI shielding solution that does not require the aforementioned metal housing used in the known SFP optical communications module. The module has latching/delatching features formed in the plastic body of the pluggable optical communications module that are relatively simple in comparison to the complex latching/delatching mechanism of the known SFP design. By eliminating the metal housing and the complex latching/delatching mechanism, the cost of the module and of the system are significantly reduced. Embodiments of the module configuration also obviate the need for performing an optical turn in any light path by using an electrical interface between an ESA of the module and a system PCB that performs a 90° turn in the electrical domain.

Illustrative embodiments of the optical communications module and of an optical communications system that incorporates the module are described herein with reference to the figures, in which like reference numerals represent like elements, features or components. It should be noted that features, elements or components in the figures are not necessarily drawn to scale, emphasis instead being placed on demonstrating principles and concepts of the invention.

Figure 2A:
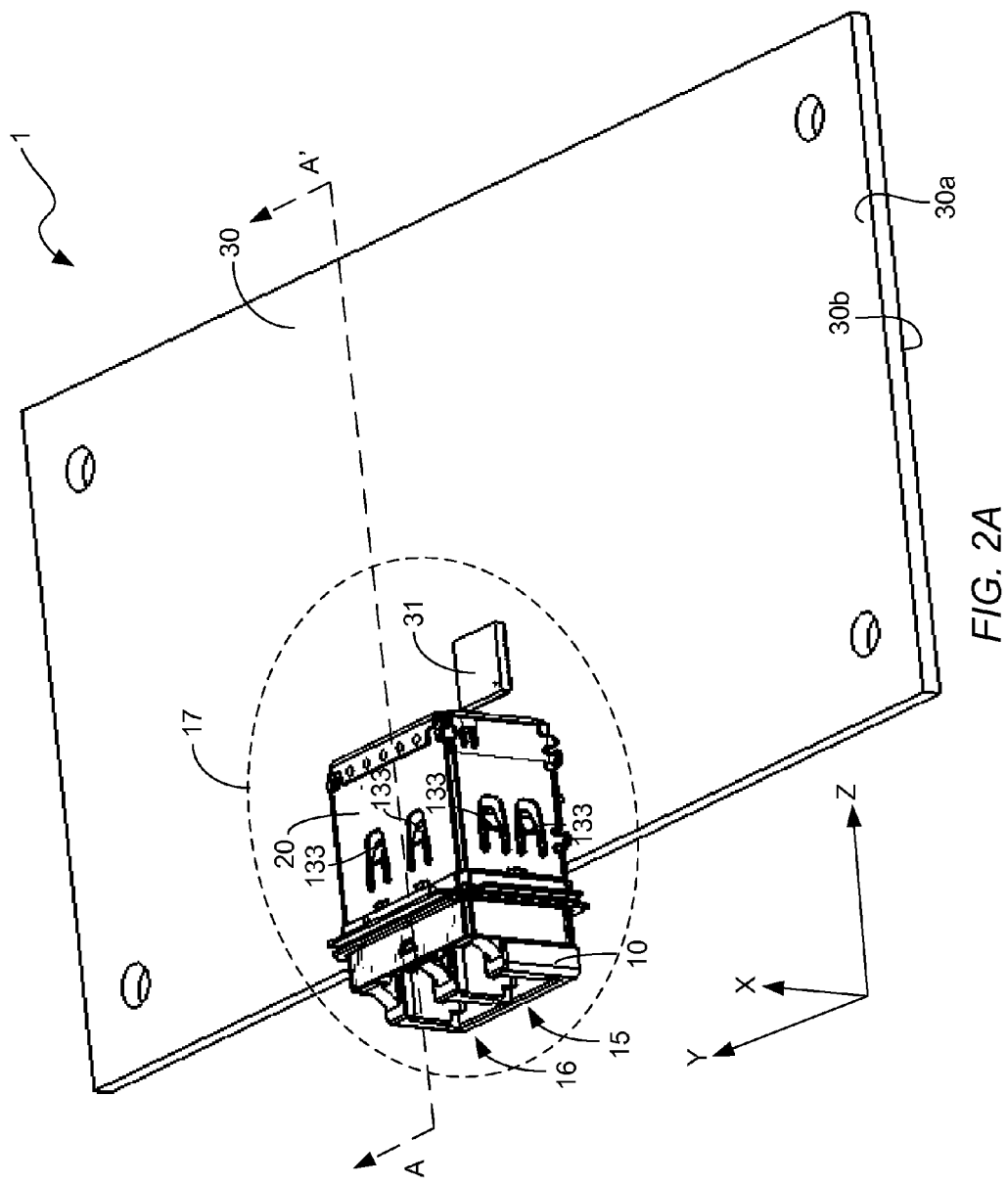
FIG. 2A illustrates a top perspective view of the optical communications system shown in FIG. 1 without the first and second optical connectors.
Figure 2B:
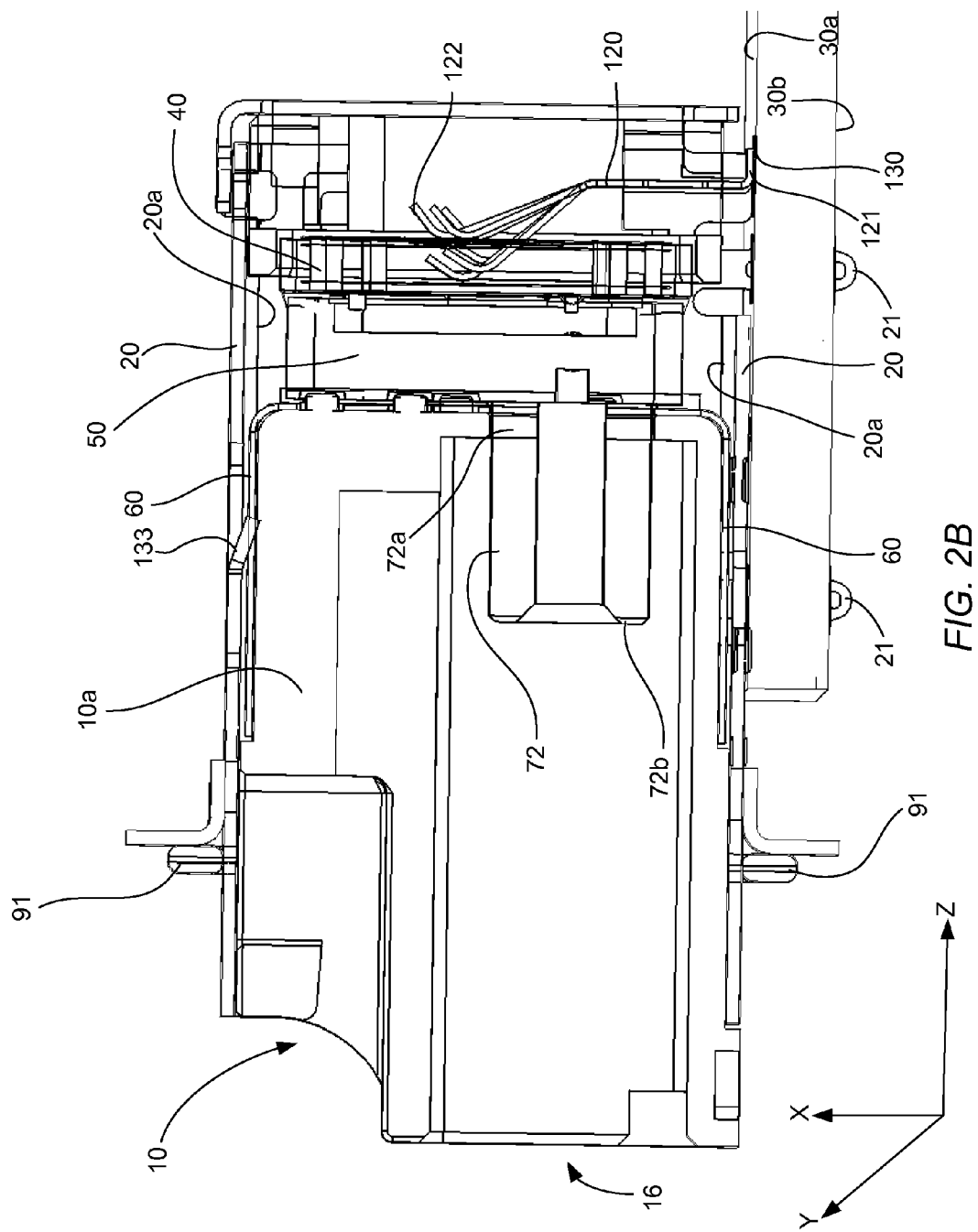
FIG. 2B illustrates a side cross-sectional perspective view of the portion of the optical communications system shown in FIG. 2A within dashed circle 17 and taken along line A-A'.

FIG. 1 illustrates a top perspective view of an optical communications system 1 in accordance with an illustrative embodiment comprising a pluggable optical communications module 10, a metal cage 20 in which the module 10 is installed, and a motherboard printed circuit board (PCB) 30 on which the cage 20 is mounted. First and second optical connectors 11 and 12 of first and second optical fiber cables 13 and 14, respectively, are connected to first and second receptacles 15 and 16, respectively, of the module 10. FIG. 2A illustrates a top perspective view of the optical communications system 1 shown in FIG. 1 without the optical connectors 11 and 12 and without the optical fiber cables 13 and 14. FIG. 2B illustrates a side cross-sectional perspective view of the portion of the optical communications system 1 shown in FIG. 2A within dashed circle 17 taken along line A-A'.

For illustrative purposes, the motherboard PCB 30 is depicted as having an IC package 31 mounted thereon. The IC package 31 may be, for example, a controller IC package having driver circuitry configured to drive one or more optoelectronic transmitter devices (e.g., laser diodes) of the module 10 and receiver circuitry (e.g., clock and data recovery (CDR) circuitry) configured to decode an electrical signal produced by one or more optoelectronic receiver devices (e.g., P-intrinsic-N (PIN) diodes) of the module 10. The motherboard PCB 30 has electrically-conductive traces (not shown) and vias (not shown) running through it and electrical contact pads (not shown) on its upper and/or lower surfaces 30a and 30b, respectively, for electrically interconnecting the IC package 31 and the module 10 with the motherboard PCB 30.

The term "optoelectronic device," as that term is used herein, is intended to denote photonic devices such as laser diodes and PIN diodes, but is not intended to be limited to such devices. The term also includes light sources and light detectors that are not photonic devices, but that perform some type of electrical-to-optical conversion or optical-toelectrical conversion that allows optical signals to be produced or detected, respectively.

Figure 3A:
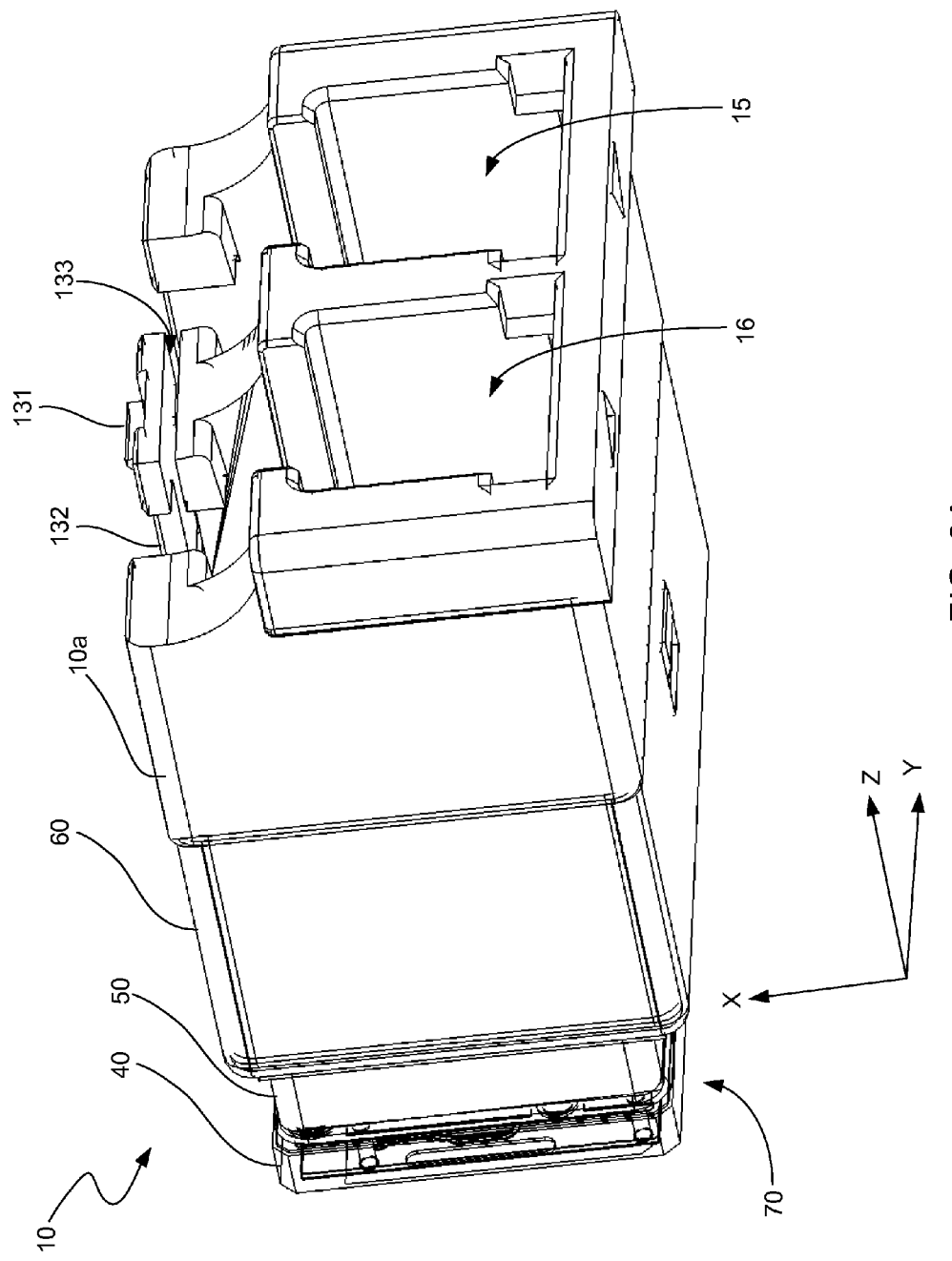
FIG. 3A illustrates a front perspective view of the optical communications module of the optical communications system shown in FIG. 2A without the cage and the PCB.
Figure 3B:
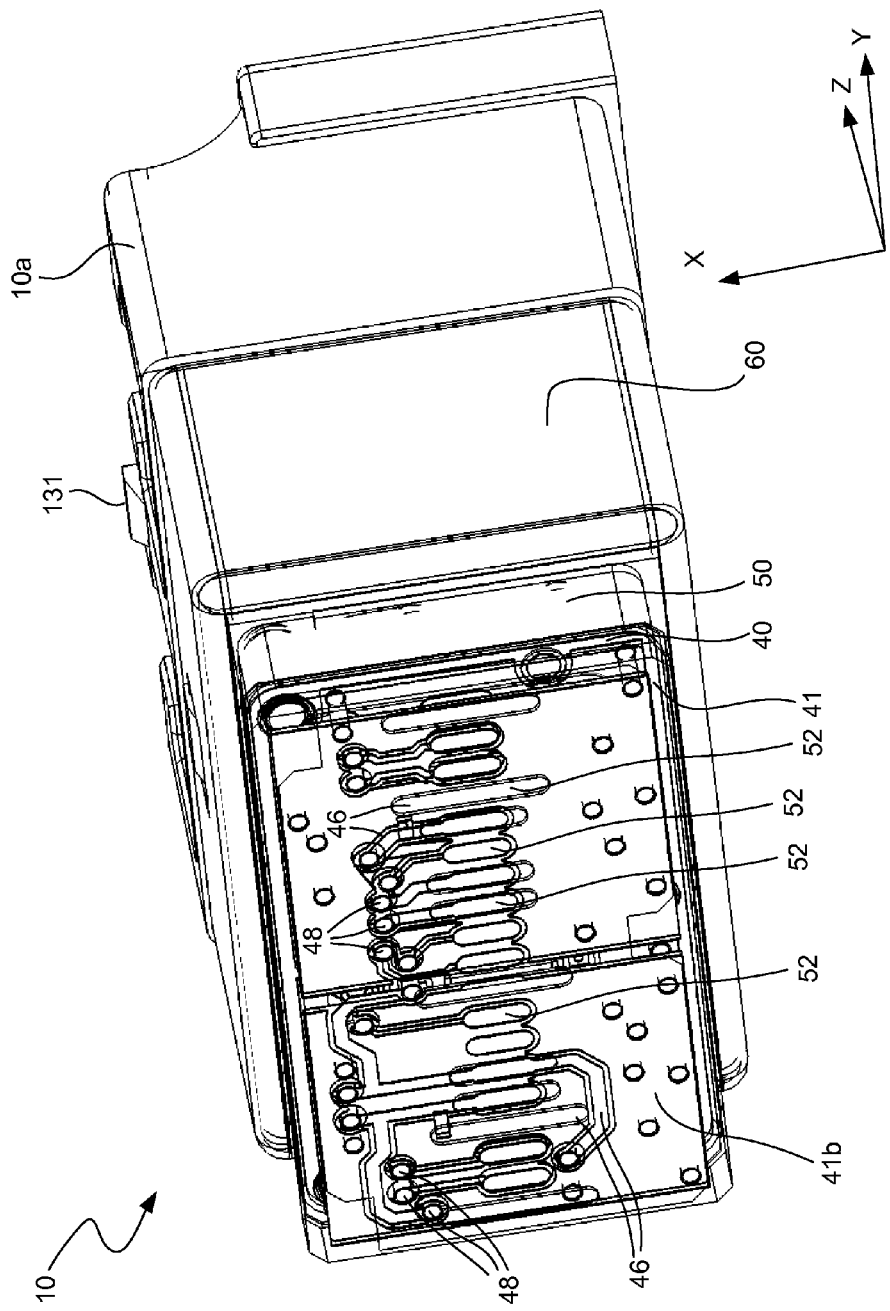
FIG. 3B illustrates a back perspective view of the optical communications module shown in FIG. 3A.

FIG. 3A illustrates a front perspective view of the optical communications module 10 of the optical communications system 1 shown in FIG. 2A without the cage 20 and without the PCB 30. FIG. 3B illustrates a back perspective view of the optical communications module 10 shown in FIG. 3A. The optical communications module 10 includes a module body 10a, an electrical subassembly (ESA) 40, an optical subassembly (OSA) 50, and an EMI shield 60. The EMI shield 60 is secured to a back portion of the module body 10a. The OSA 50 is secured to a back side of the EMI shield 60 and, as will be described below in more detail, to the back side of the module body 10a through perforations (not shown) formed in the EMI shield 60. The ESA 40 is secured to a back side of the OSA 50. The combination ESA 40 and the OSA 50 form an optical/electrical (O/E) module 70.

Figure 4:
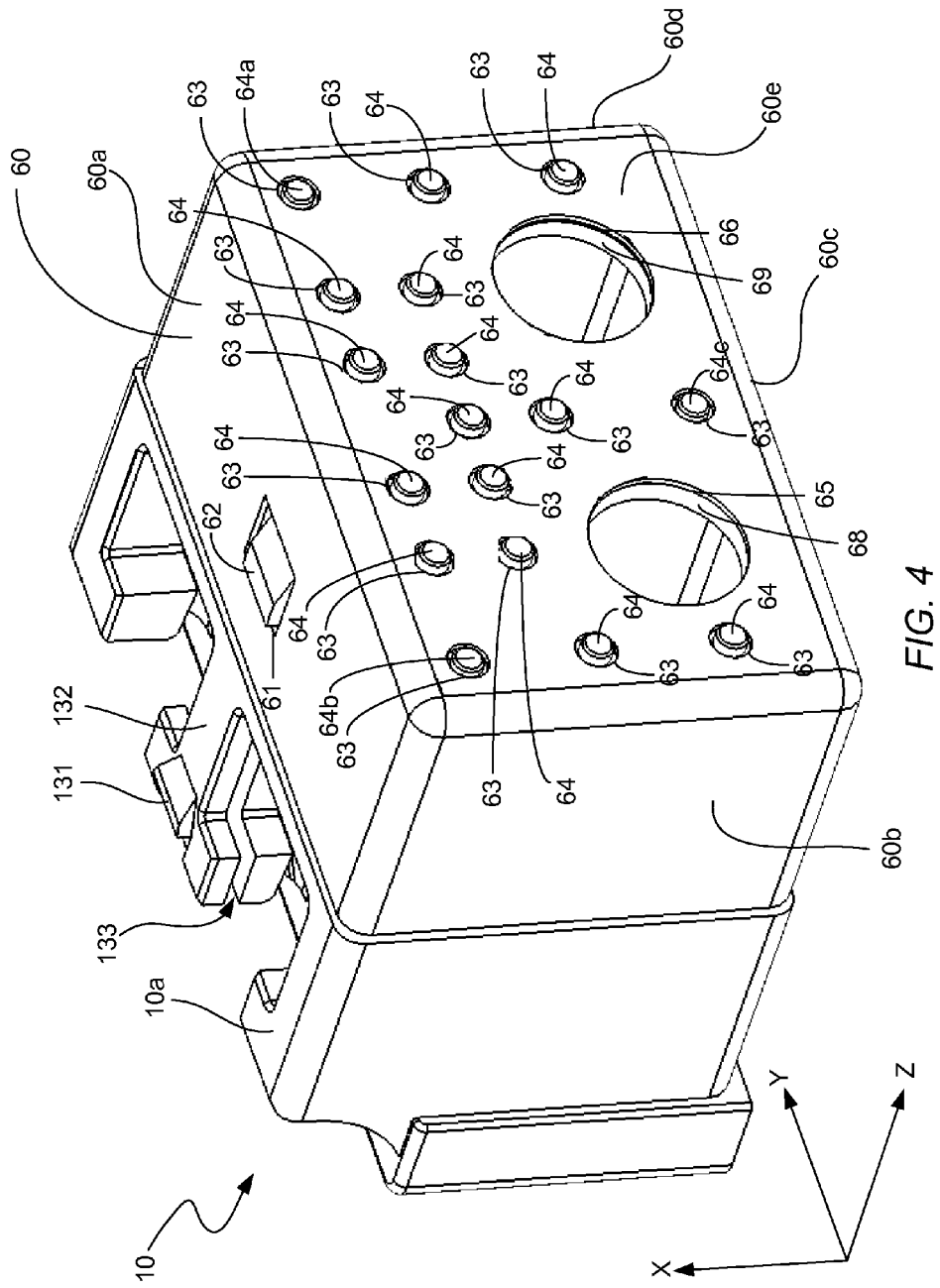
FIG. 4 illustrates a back perspective view of the optical communications module shown in FIG. 3A without the O/E module.
Figure 5:
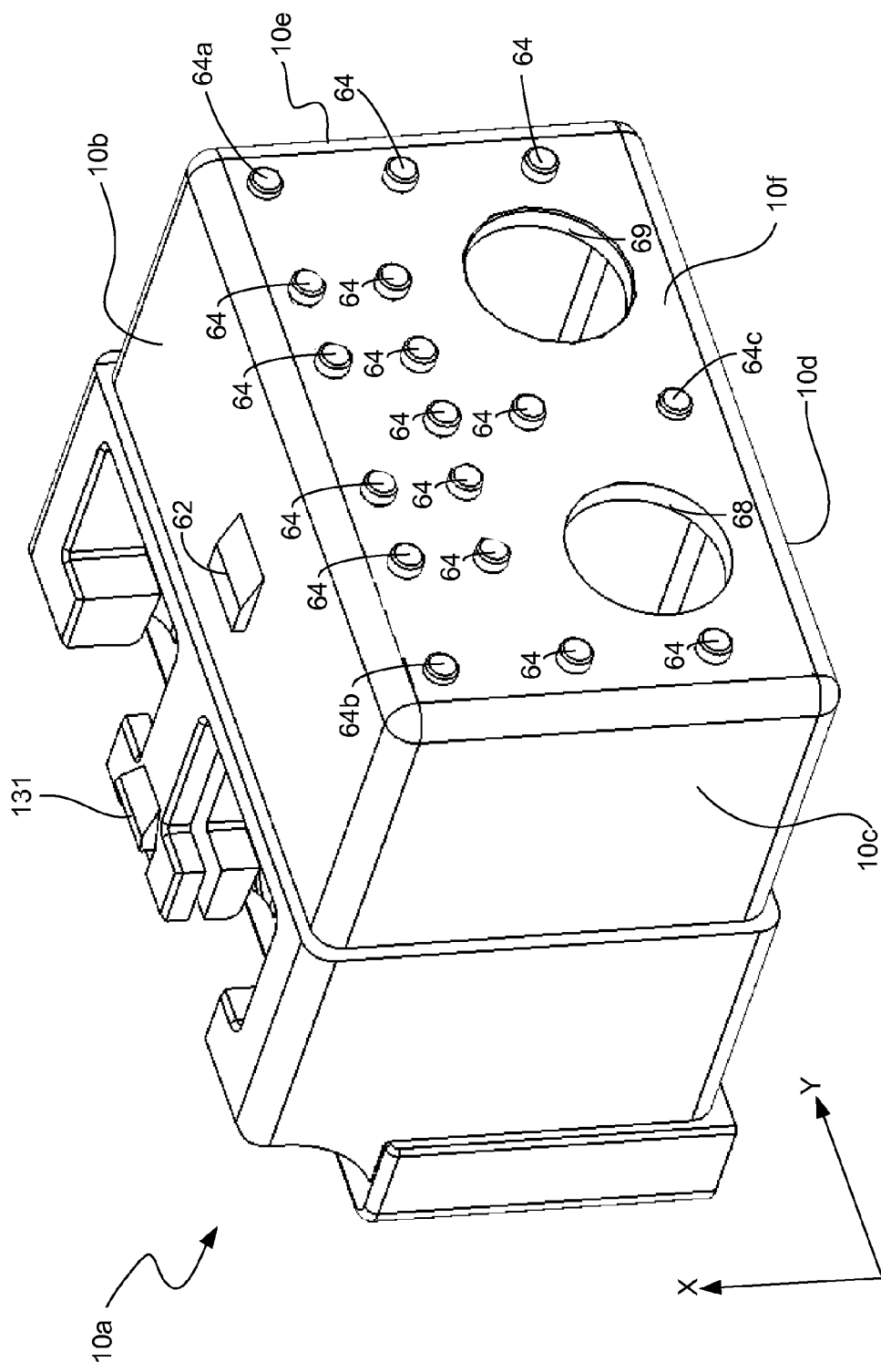
FIG. 5 illustrates a back perspective view of the optical communications module shown in FIG. 4 with the EMI shield removed from the module housing.
Figure 6A:
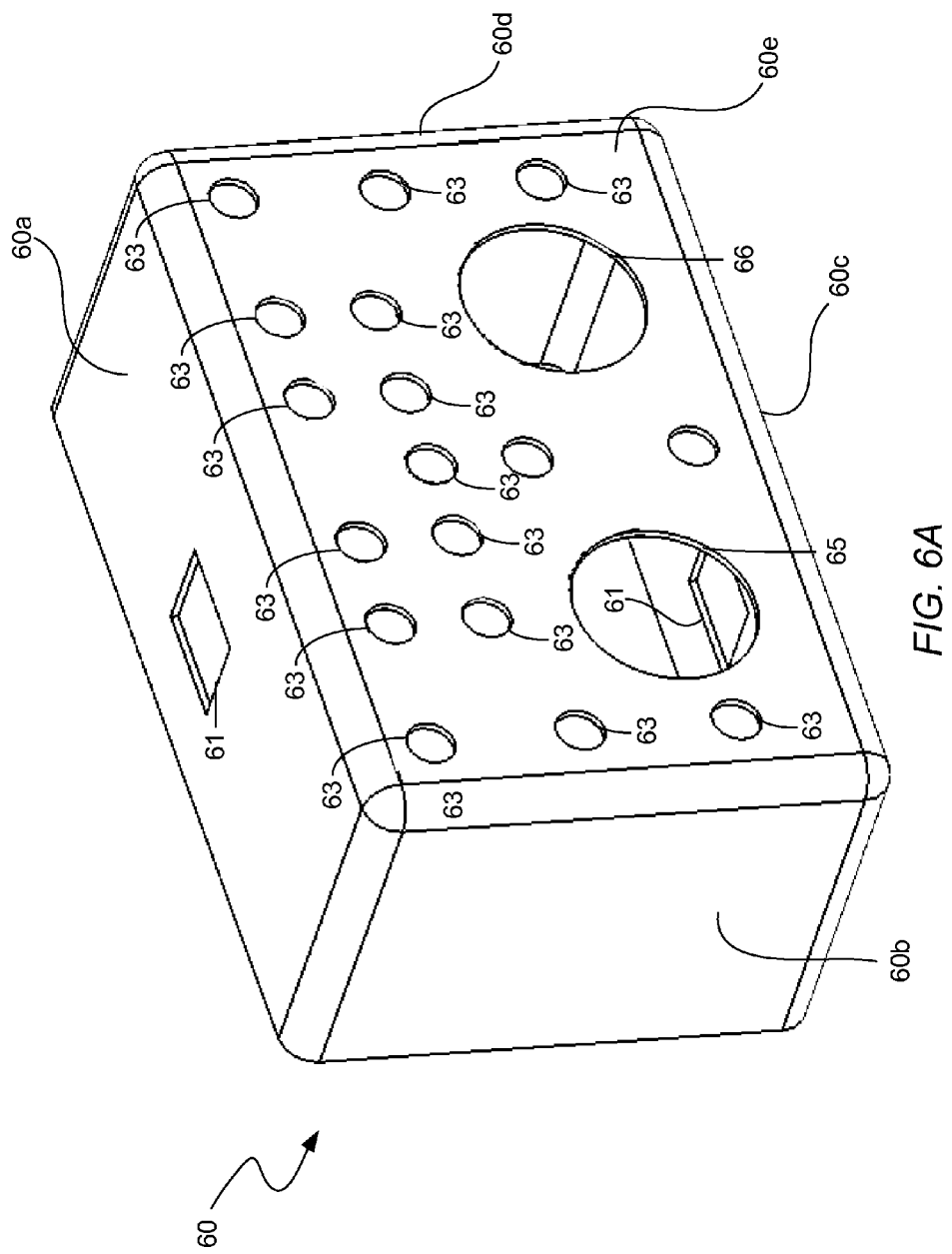
FIG. 6A illustrates a back perspective view of the EMI shield shown in FIG. 4.
Figure 6B:
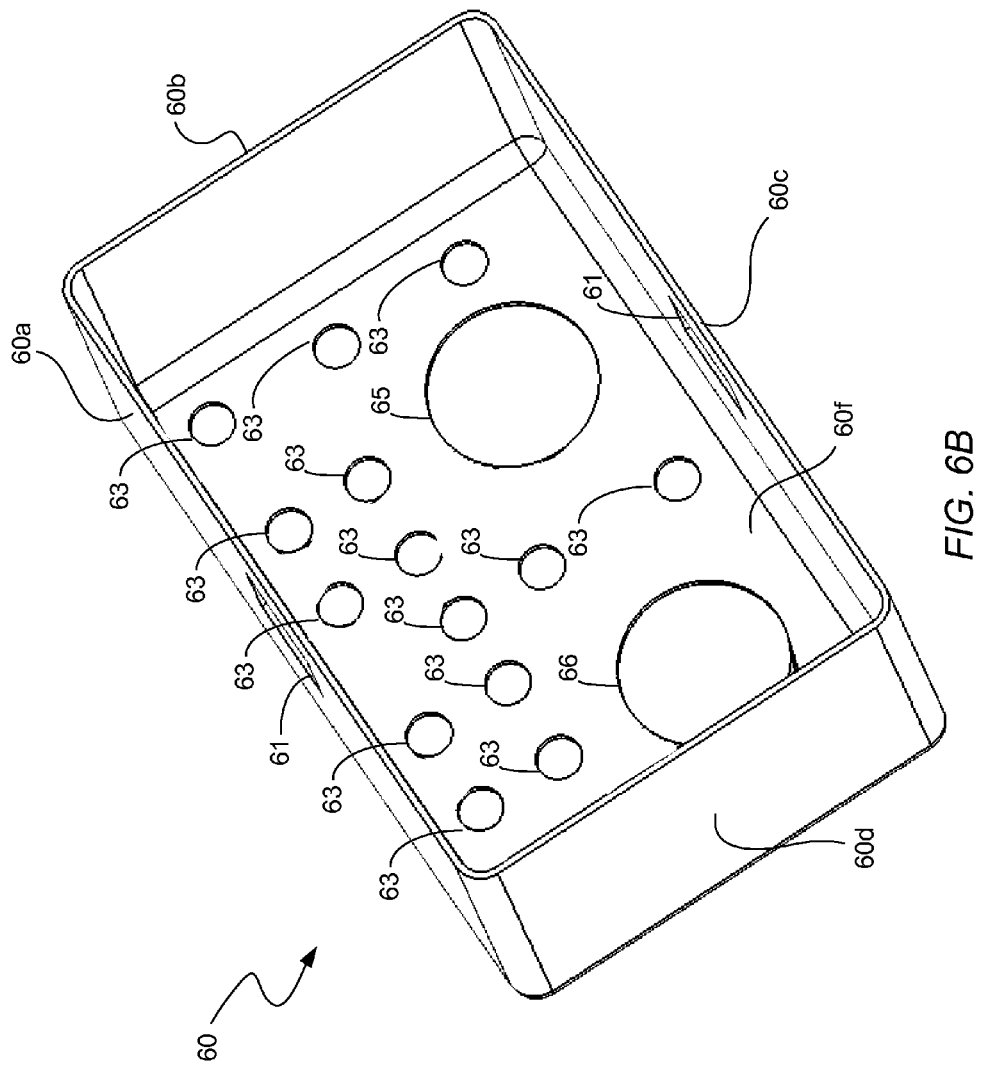
FIG. 6B illustrates a front perspective view of the EMI shield shown in FIG. 6A.
Figure 7:
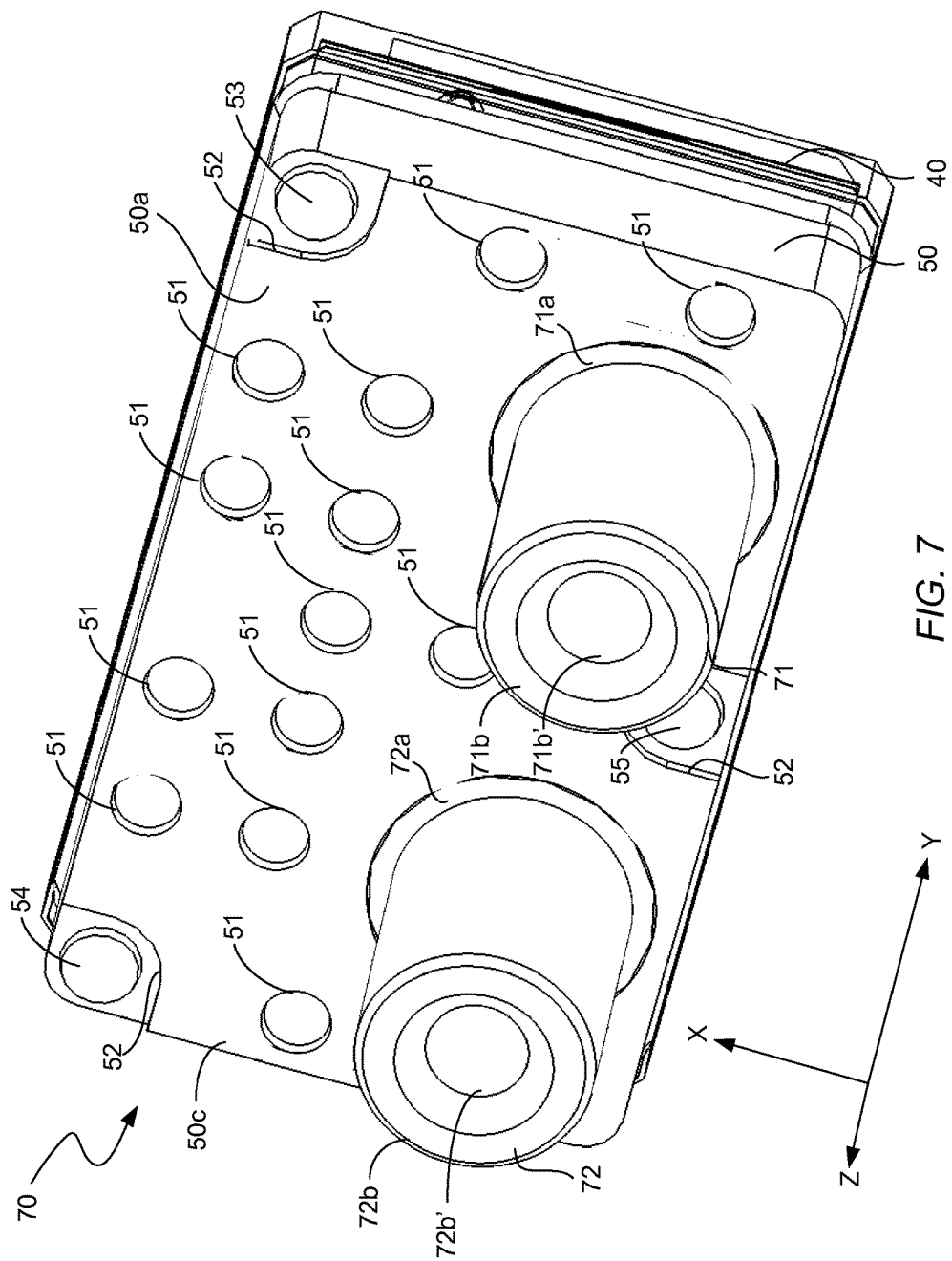
FIG. 7 illustrates a front perspective view of the OSA and ESA shown in FIG. 3A having first and second metal flanges secured to the OSA.

FIG. 4 illustrates a back perspective view of the optical communications module 10 shown in FIG. 3A with the O/E module 70 removed to reveal the back side of the EMI shield 60. FIG. 5 illustrates a back perspective view of the optical communications module 10 shown in FIG. 4 with the EMI shield 60 removed from the module body 10a. FIG. 6A illustrates a back perspective view of the EMI shield 60 shown in FIG. 4. FIG. 6B illustrates a front perspective view of the EMI shield 60 shown in FIG. 6A. FIG. 7 illustrates a front perspective view of the O/E module 70 shown in FIG. 3A in accordance with an illustrative embodiment in which first and second metal flanges 71 and 72 have been secured to the OSA 50.

With reference to FIGS. 6A and 6B, it can be seen that the EMI shield 60 generally has the shape of a box with one side open for receiving the back end of the module body 10a. The EMI shield 60 has five sides: a top side 60a; a bottom side 60b; a left side 60c; a right side 60d; and a back side 60e. The top and bottom sides 60a and 60c (FIG. 6B) of the EMI shield 60 have openings 61 formed therein for receiving respective latches 62 (FIGS. 4 and 5) disposed on opposite sides of the module body 10a. Only one of the latches 62 is visible in the figures, but they are identical in shape and size. The back side 60e of the EMI shield 60 has round perforations 63 formed therein for receiving round studs 64 (FIGS. 4 and 5) disposed on the back side of the module body 10a. The perforations 63 and the studs 64 have almost equal diameters. The back side 60e of the EMI shield 60 has two round receptacles 65 and 66 formed therein for receiving the first and second flanges 71 and 72 (FIG. 7) of the OSA 50. Flanges 71 and 72 will be in an interference fit with surfaces 50f and 50g (FIG. 10), respectively, as will be described below in more detail. The back side of the module body 10a has first and second round receptacles 68 and 69 (FIG. 5) formed therein that are aligned with the receptacles 65 and 66 of the EMI shield 60 for receiving the first and second flanges 71 and 72 (FIG. 7), respectively.

When the EMI shield 60 is pressed onto the back portion of the module body 10a, as shown in FIG. 4, the latch 62 disposed on the module body 10a mates with the opening 61 formed in the top side 60a of the EMI shield 60 and the studs 64 of the module body 10a pass through the respective perforations 63 formed in the EMI shield 60. An inner surface 60f (FIG. 6B) of the back side 60e of the EMI shield 60 is in contact with the back side of the module body 10a. An adhesive material (not shown) such as epoxy, for example, is placed on the inner surface 60f of the back side 60e of the EMI shield 60, on the back side of the module body 10a, on the studs 64, and/or on the perforations 63 to bond the EMI shield 60 to the module body 10a. Epoxy is also placed on the back side 60e of the EMI shield 60 and on the studs 64 (FIG. 5) of the module body 10a, except that care should be taken to ensure that epoxy is not placed on the ends of studs 64a, 64b and 64c (FIG. 5). Inner surfaces of the top, bottom, left and right sides 60a-60d (FIG. 4) are in contact with top, bottom, left and right sides 10b-10e (FIG. 5), respectively, of the module body 10a.

A front surface 50a (FIG. 7) of the OSA 50 has round blind holes 51 formed therein having diameters that are slightly larger than the diameters of the studs 64 (FIGS. 4 and 5) disposed on the back side of the module body 10a. The blind holes 51 are positioned such that when the O/E module 70 is secured to the back side 60e of the EMI shield 60 with the first and second flanges 71 and 72 passing through the receptacles 65 and 66, respectively, of the EMI shield 60 and through the receptacles 68 and 69, respectively, of the module body 10a, ends of the studs 64 are mated with the respective blind holes 51. The mating of the ends of the studs 64 with the respective blind holes 51 strengthens the mechanical coupling between the module body 10a and the O/E module 70. An adhesive material such as epoxy, for example, is placed on the ends of the studs 64 and/or in the blind holes 51 to secure the O/E module 70 to the module body 10a.

The mating of the first and second flanges 71 and 72 with the receptacles 65 and 66, respectively, and with receptacles 68 and 69, respectively, aligns the O/E module 70 with the module body 10a in X and Y dimensions of an X, Y, Z Cartesian coordinate system. The front surface 50a (FIG. 7) of the OSA 50 has stops 53, 54 and 55 formed therein that abut the ends of the studs 64a, 64b and 64c, respectively, disposed on the back side of the module body 10a. Similarly, as will be described below in more detail with reference to FIGS. 8 and 9, pins 58a, 58b and 58c of the OSA 50 abut stops 49a, 49b, and 49c, respectively, of the ESA 40 without any epoxy being disposed in between them. This abutment controls the length of the module 10 in the Z dimension from a latch 131 (FIGS. 3A-5) disposed on the module body 10a to the stops 49a, 49b and 49c of the ESA 40. This length needs to be precisely controlled to ensure that the back side 41b (FIG. 3B) of the PCB 41 will apply proper displacement of spring fingers 120 (FIGS. 14A and 14B) disposed inside of the cage 20 to provide proper contact force for good electrical connection, as will be described below in more detail with reference to FIGS. 14A and 14B. In essence, the abutment between the ends of the studs 64a, 64b and 64c and the stops 53, 54 and 55, respectively, provides precision Z-dimensional control that prevents the thicknesses of the EMI shield 60 and of the adhesive material from being involved in determining this distance.

Figure 8:
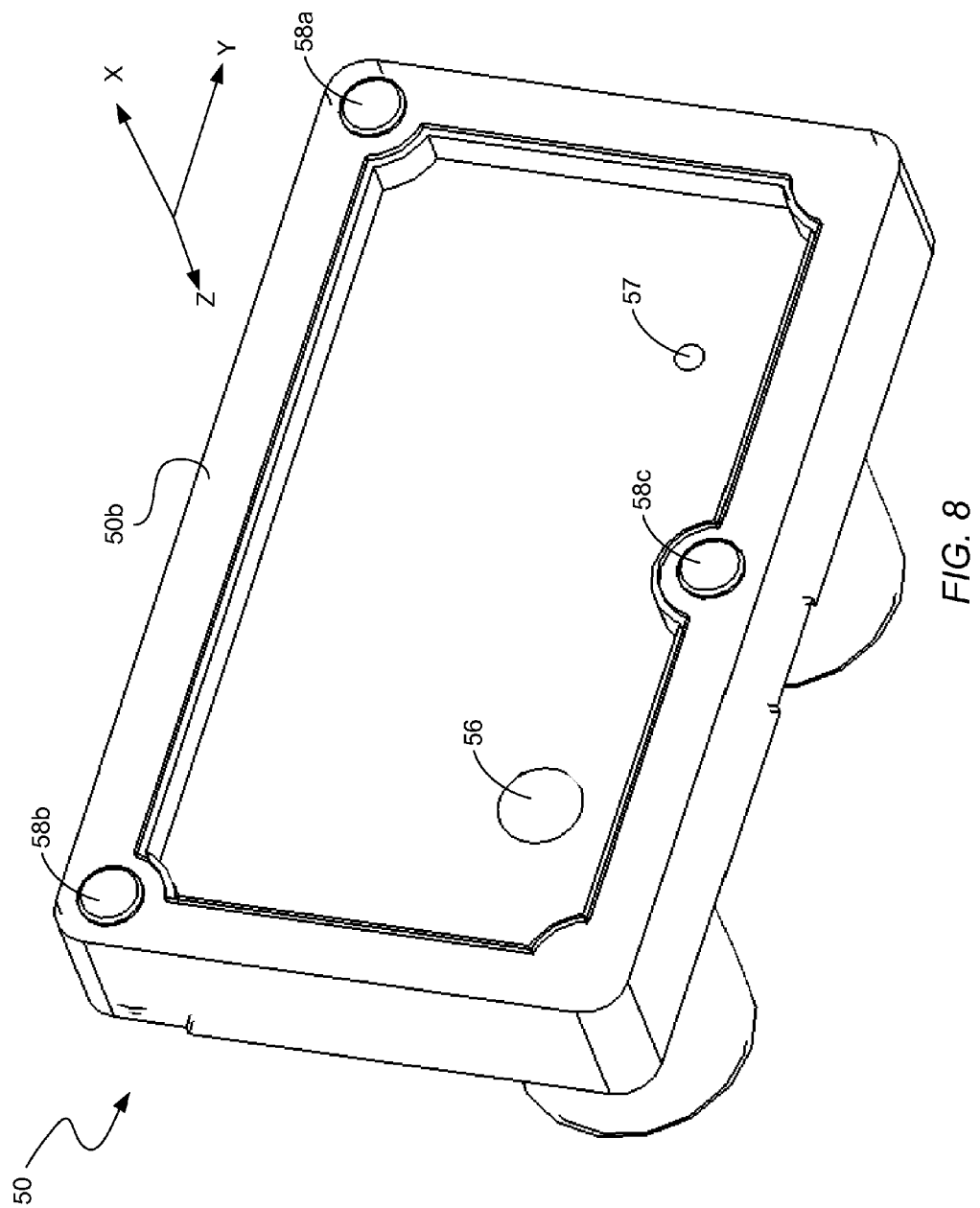
FIG. 8 illustrates a back perspective view of the OSA shown in FIG. 7.

FIG. 8 illustrates a back perspective view of the OSA 50 shown in FIG. 7. A back side 50b of the OSA 50 has first and second lenses 56 and 57, respectively, formed therein for coupling light between respective optoelectronic devices (not shown) of the ESA 40 and ends of optical fibers of the optical fiber cables 13 and 14 (FIG. 1), respectively, as will be described below in more detail with reference to FIG. 9. The back side 50b of the OSA 50 has round pins 58a, 58b and 58c formed thereon that are used for aligning the OSA 50 with the ESA 40 in the Z dimension, as will be described below in more detail with reference to FIG. 9.

As is best illustrated in FIGS. 2B and 4, the EMI shield 60 overlaps the back portion of the module body 10a and completely encircles the flanges 71 and 72 in the X and Y dimensions. Only one of the flanges, flange 72, is visible in the cross-sectional side view of FIG. 2B. The ends of the flanges 71 and 72 are EMI open apertures through which EMI radiation may pass. The module body 10a is typically made of a molded plastic material. Therefore, without the EMI shield 60, EMI radiation may escape the module 10 through back side 10f (FIG. 5) of the module body 10a. The EMI shield 60 is a solid piece of metallic material except for the perforations 63 and the receptacles 65 and 66 (FIGS. 4, 6A and 6B) formed in the back side 60e. The outer surfaces of the top side 60a, bottom side 60b, left side 60c and right side 60d (FIGS. 4, 6A and 6B) of the EMI shield 60 are in contact with inner surfaces 20a (FIG. 2B) of the metal cage 20. The cage 20 has a metallic EMI gasket 91 disposed about its periphery that comes into contact with a metal body (not shown) that houses the optical communications system 1, such as the body of a server or router, for example. The combination of the EMI shield 60, the cage 20 and the EMI gasket 91 provide an EMI shielding solution that is very effective at limiting the amount of EMI that may escape from the module 10 to levels that are accepted or required.

Those of skill in the art will understand the manner in which the maximum allowable size of the perforations 63 can be estimated given the known maximum frequency content of the optical communications module 10. Similarly, the holes 71b' and 72b' in the center of the flanges 71 and 72, respectively, and the length of the flanges 71 and 72 will only allow frequencies beyond a particular frequency range to pass out of the flanges 71 and 72, respectively. Decreasing the diameter of perforations 63 and the diameter of the holes 71b' and 72b' in the center of the flanges 71 and 72 increases the minimum frequency that can pass through these apertures, which reduces the amount of EMI radiation that will leak out of the module 10.

The optical communications module 10 has a form that is generally characteristic of SFP, C form factor pluggable (CFP), CXP, etc., configurations: a rectangular-shaped body 10a and first and second optical receptacles 15 and 16 (FIG. 2A) at the forward end that are configured to mate with LC optical connectors or similar optical connectors (not shown) disposed on ends of first and second optical fiber cables. In accordance with this illustrative embodiment, the optical communications module 10 is an SFP module and the first and second receptacles 15 and 16 are adapted (i.e., shaped and sized) to mate with respective LC optical connectors. Therefore, in accordance with this embodiment, the optical connectors 11 and 12 are LC optical connectors.

Known SFP modules typically have module bodies that are greater in length than the module body 10a because their ESAs typically include PCBs that are parallel to the motherboard PCB. With known SFP modules, the optical pathways are typically turned by 90° relative to the optical axes of the LC optical connectors, and the light source or light detector is mounted on a surface of the motherboard PCB or on a PCB of the module that is parallel to the motherboard PCB. In those designs, the optical axis of the light detector or light source is at a 90° angle relative to the optical axis of the respective LC optical connector. Stated another way, the known SFP modules typically perform a 90° optical turn.

In accordance with the illustrative embodiment being described herein, the 90° turn is performed electrically rather than optically and the optical axis of the light source (not shown) or detector (not shown) is coaxial with the optical axis of the respective LC connector 15 or 16. The ESA 40 (FIGS. 2B, 3A and 3B) is a PCB that is perpendicular to the motherboard PCB 30 (FIGS. 1 and 2B). By performing the turn electrically rather than optically, the module 10 can be made significantly shorter in length than existing SFP modules. The EMI shield 60 is designed to accommodate such an arrangement.

Figure 9:
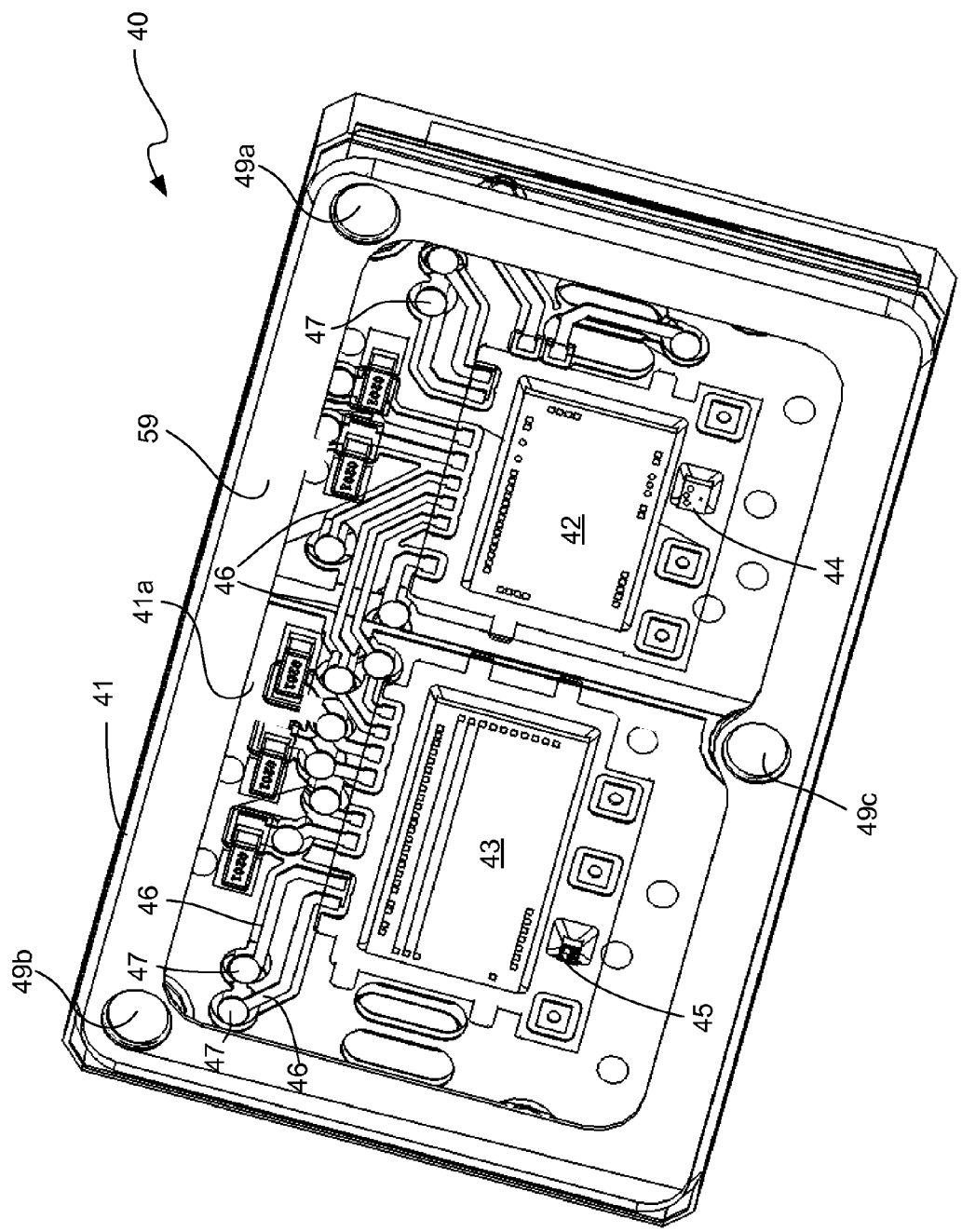
FIG. 9 illustrates a front perspective view of the ESA shown in FIG. 7.

FIG. 9 illustrates a front perspective view of the ESA 40 of the O/E module 70 shown in FIG. 7. In accordance with this illustrative embodiment, the ESA 40 comprises a module PCB 41, first and second ICs 42 and 43 mounted on a front side 41a of the PCB 41, first and second optoelectronic devices 44 and 45 mounted on the front side 41a of the PCB 41, a plurality of electrically-conductive traces 46 disposed on the front side 41a and on the back side 41b of the PCB 41 (FIG. 3B), a plurality of electrically-conductive contact pads 47 disposed on the front side 41a of the PCB 41 (FIG. 8), a plurality of electrically-conductive contact pads 48 disposed on the back side 41b of the PCB 41 (FIG. 3B), and a plurality of electrically-conductive vias (not shown) extending between the front side 41a and the back side 41b of the PCB 41.

The front side 41a of the module PCB 41 has stops 49a, 49b and 49c formed therein that abut the alignment pins 58a, 58b and 58c, respectively, when the ESA 40 is secured to the OSA 50. An adhesive material 59 such as epoxy, for example, is disposed on the front side 41a of the module PCB 41 and/or on the back side 50b of the OSA 50 to fixedly secure the ESA 40 to the OSA 50. When dispensing the epoxy 59, care should be taken not to place any of the epoxy on the stops 49a, 49b and 49c. The abutment between the alignment pins 58a-58c and the stops 49a-49c, respectively, precisely controls the thickness of the O/E module 70 (FIG. 7) in the Z dimension.

Thus, the abutment between the studs 64a-64c and the stops 53-55, respectively, in combination with the abutment between the alignment pins 58a-58c and the stops 49a-49c, respectively, precisely controls the distance between the length of the module 10 in the Z dimension from the latch 131 of the module body 10a to the front side 41a of the module PCB 41 on which the first and second optoelectronic devices 44 and 45 mounted. This precision Z-dimensional control ensures that spring fingers 120 will be properly displaced to provide proper spring forces that are needed for good electrical contact, as will be described below in more detail with reference to FIGS. 14A and 14B.

Figure 10:
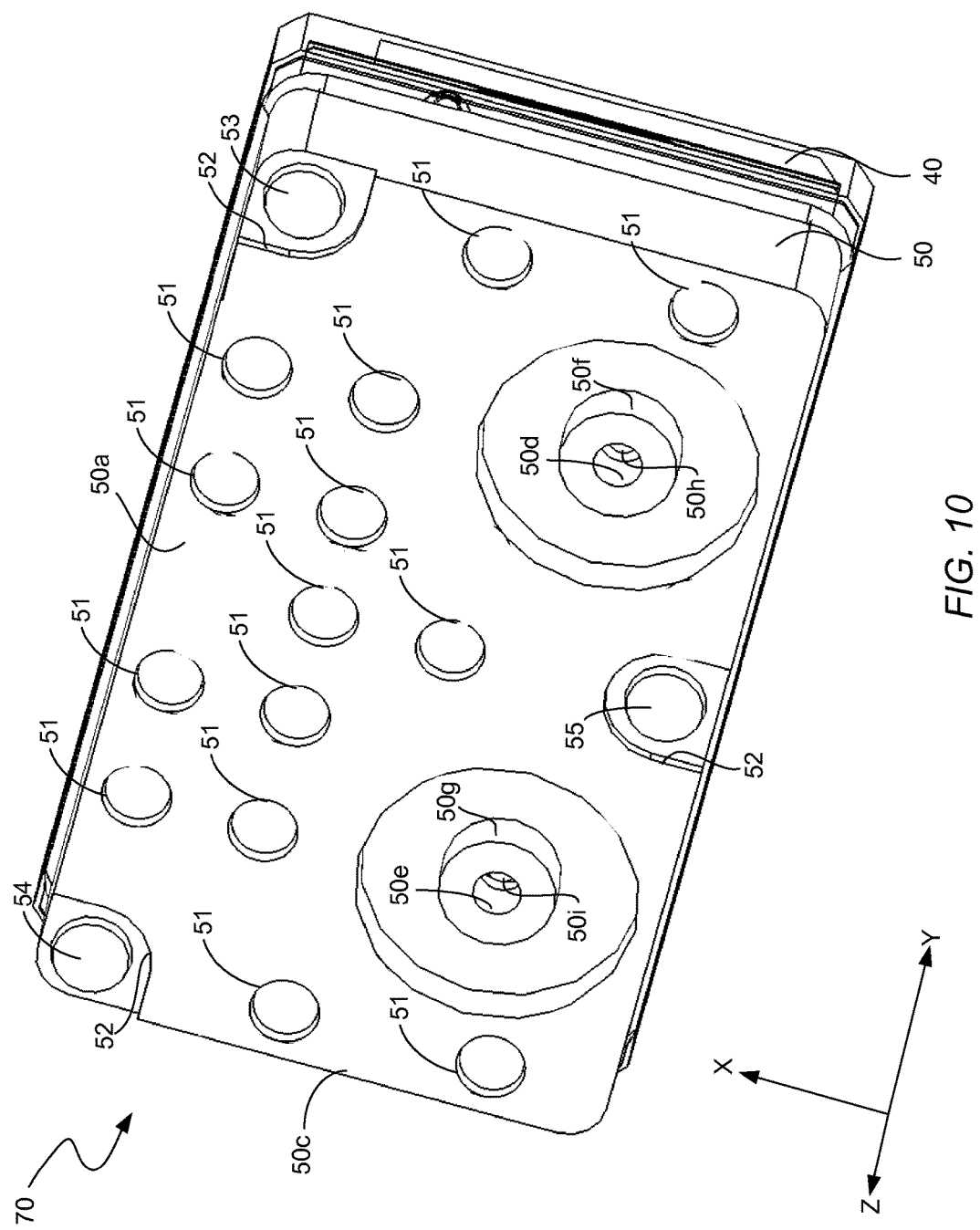
FIG. 10 illustrates a front perspective view of the OSA shown in FIG. 7 without the first and second metal flanges.

FIG. 10 illustrates a front perspective view of the O/E module 70 shown in FIG. 7 with the first and second metal flanges 71 and 72 removed. The metal flanges 71 and 72 (FIG. 7) are separate parts from the OSA body 50c that are attached during the process of assembling the module 10. One of the advantages of this illustrative embodiment is that alignment of the optoelectronic devices 44 and 45 of the ESA 40 can be checked and adjusted before the flanges 71 and 72 are attached to the OSA 50. Although the flanges 71 and 72 could be integrally formed with the OSA body 50c such that the OSA body 50c and the flanges 71 and 72 are a unitary part made of a homogeneous material (e.g., molded plastic), the relatively long lengths of the flanges 71 and 72 would make it difficult to view the optoelectronic devices 44 and 45 from in front of the flanges 71 and 72 to determine whether they are in precise alignment with the lenses 56 and 57, respectively, of the OSA 50. This is because it would be difficult for the human eye or an image acquisition device (e.g., a camera) to collect enough light when viewing the optoelectronic devices 44 and 45 from the opposite ends of the flanges 71 and 72. If the flanges 71 and 72 are separate parts from the OSA body 50c, enough light can be collected when viewing the optoelectronic devices 44 and 45 through the holes 50d and 50e before the flanges 71 and 72 are attached to the OSA body 50c to perform the alignment process with relative ease.

The optoelectronic device 44 is typically a PIN diode and optoelectronic device 45 is typically a vertical cavity surface emitting laser diode (VCSEL). In accordance with this illustrative embodiment, the OSA 50 has lenses 50h and 50i (FIG. 10) disposed therein inside of the holes 50d and 50e, respectively. The lens 50h collimates light output from the end of an optical fiber of optical fiber cable 13 (FIG. 1). The lens 56 (FIG. 8) is typically a focusing lens that focuses light collimated by lens 50h onto the PIN diode 44. The lens 57 (FIG. 8) is typically a collimating lens that collimates the light beam emitted by the VCSEL 45. The lens 50i focuses the collimated light from lens 57 onto the end of an optical fiber of optical fiber cable 14 (FIG. 1). Of course, other types of optical elements and optoelectronic devices may be used for these purposes, as will be understood by those of skill in the art, in view of the description being provided herein.

The process of assembling the module 10 is typically performed as follows: the EMI shield 60 is attached to the back side of the module body 10a (FIG. 4) via the latch 62 of the module body 10a engaging the opening 61 of the EMI shield 60; components of the ESA 40 are placed on and secured to the PCB 41, including the optoelectronic devices 44 and 45, which are placed a distance apart from one another that is exactly equal to the distance between the lenses 56 and 57 (FIG. 8); the OSA 50 is aligned with the PCB 41 to bring the lenses 56 and 57 into alignment with the optoelectronic devices 44 and 45, respectively; once aligned, the OSA 50 is secured with epoxy to the PCB 41; and the metal flanges 71 and 72 are press fit and attached with epoxy to OSA body 50c (FIG. 7). The surfaces 50f and 50g of the OSA 50 (FIG. 10) are complementary in shape and size to the holes 71b' and 72b' of the flanges 71 and 72 (FIG. 7), respectively, to passively align the flanges 71 and 72 with the holes 50d and 50e (FIG. 10), respectively.

While the separate attachability of the metal flanges 71 and 72 to the OSA body 50c facilitates the alignment process described above, making the flanges out of a metallic material also improves EMI shielding. With reference again to FIG. 2B, the end 72b of the metal flange 72 opposite the base 72a of the metal flange 72 is the only location on the flange 72 at which EMI radiation can escape the flange 72. This is also true for metal flange 71, which is not visible in FIG. 2B. Because the EMI shield 60 overlaps the end 72b of the flange 72 in the Z dimension, EMI radiation radiating outwardly in the X and Y directions from the end 72b will come into contact with the EMI shield 60 and be directed back toward the interior of the module body 10a by the EMI shield 60. In this way, the metal flanges 71 and 72 improve the overall effectiveness of the EMI shielding solution. However, it is not necessary in all cases for the flanges 71 and 72 to be made of a metallic material.

Figure 11:
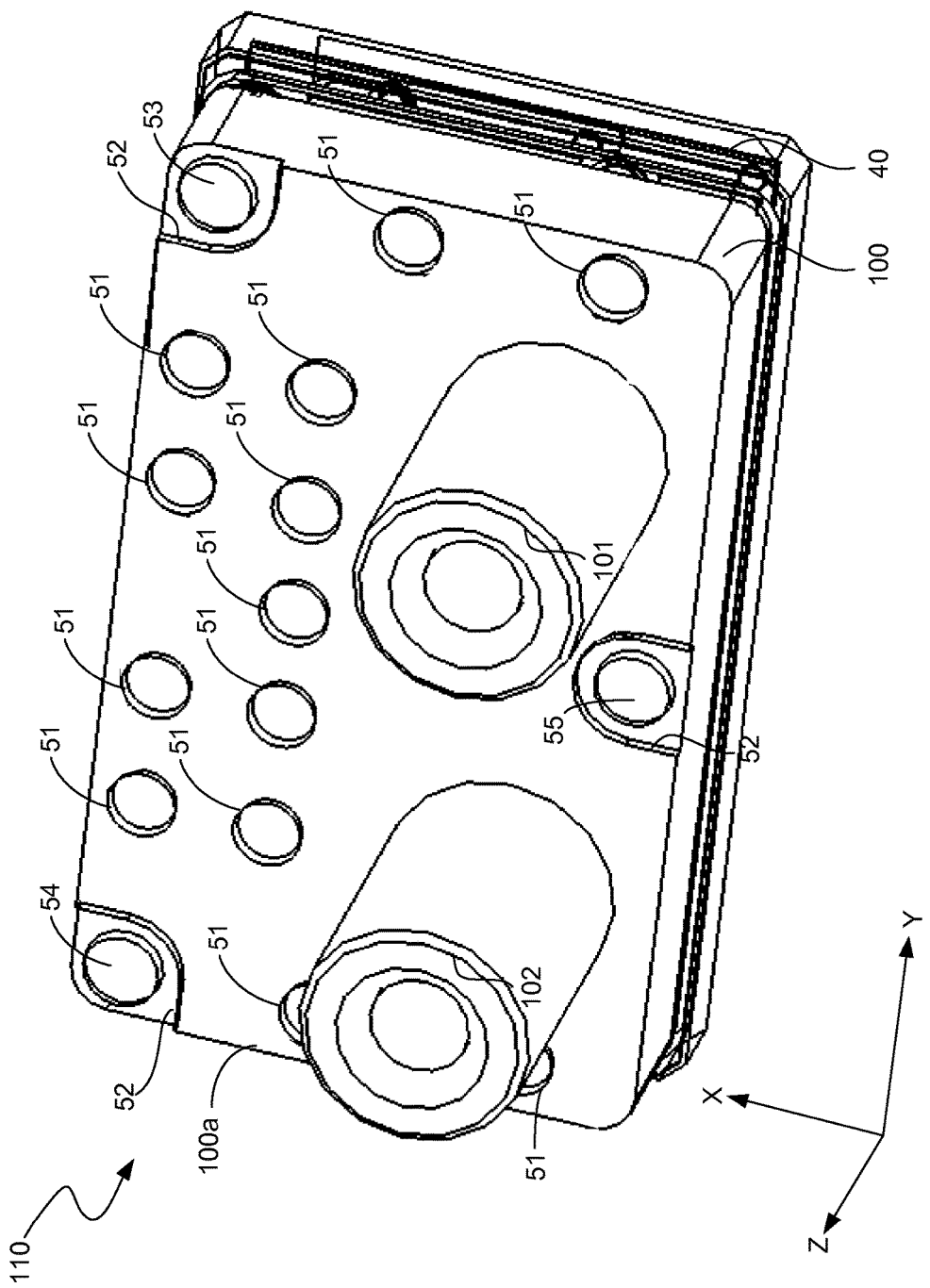
FIG. 11 illustrates a front perspective view of the OSA and ESA shown in FIG. 3A in accordance with another illustrative embodiment in which first and second flanges are integral parts of the OSA.

FIG. 11 illustrates a front perspective view of the O/E module 110 in accordance with another illustrative embodiment in which the OSA 100 has flanges 101 and 102 that are integrally, or monolithically, formed with the OSA body 100a, which is made of a molded plastic material. Known plastic molding processes can be used to form plastic molded parts with very high precision. Because many of the components of the module 10 need to have very precise spatial relationships with one another after the module 10 has been assembled, making the module body 10a and the OSA 50 out of molded plastic allows the alignment features (e.g., blind holes 51, studs 64) to be shaped, sized and located with very high precision. As indicated above, the mating of the flanges 71 and 72 with the receptacles 65, 68 and 66, 69 aligns the module body 10a with the OSA module 50 in the X and Y dimensions. Likewise, mating of the molded plastic flanges 101 and 102 with the receptacles 65, 68 and 66, 69 aligns the module body 10a with the OSA 100 in the X and Y dimensions. The features that are used to achieve Z-dimensional alignment are the same for the OSAs 50 and 100.

Figure 12A:
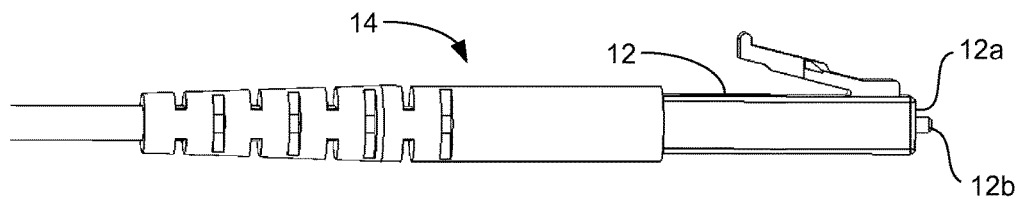
FIGS. 12A and 12B illustrate side and front perspective views, respectively, of the optical fiber cable shown in FIG. 1.
Figure 12B:
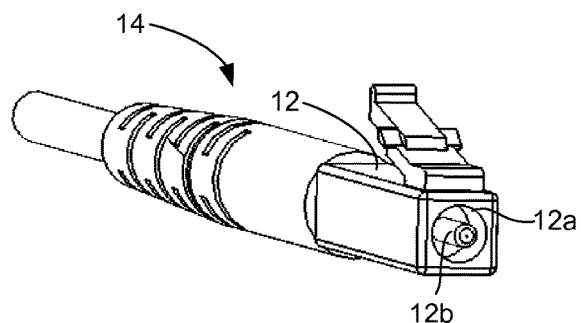
Figure 13:
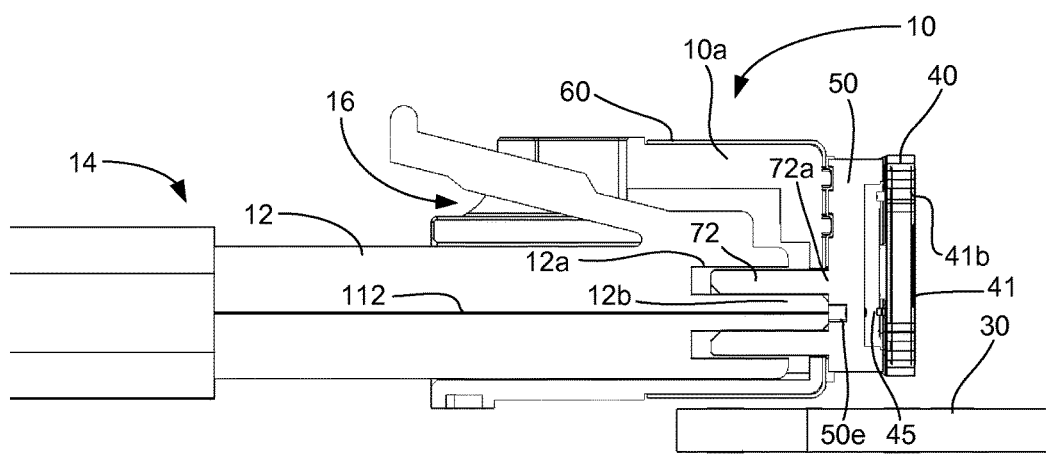
FIG. 13 is a side cross-sectional view of the portion of the optical communications system shown in FIG. 1 in the dashed circle 111 taken along dashed line B-B' without the cage.

FIGS. 12A and 12B illustrate side and front perspective views, respectively, of the optical fiber cable 14 shown in FIG. 1. FIG. 13 is a side cross-sectional view of the portion of the optical communications system 1 shown in FIG. 1 in the dashed circle 111 taken along dashed line B-B' without the cage 20. In accordance with this illustrative embodiment, the optical connector 12 is an LC optical connector, which is a well-known type of optical connector in the optical communications industry. In accordance with this illustrative embodiment, the optical communications module 10 is an SFP module configured to mate with the LC optical connectors 11 and 12, although only LC optical connector 12 is visible in the cross-sectional view of FIG. 13.

The LC optical connector 12 has a cylindrical bore 12a formed in the end of the connector 12 that is inserted into the receptacle 16 of the module 10. A ferrule 12b of the LC optical connector 12 is disposed inside of the bore 12a and has an axis that is coaxial with the central axis of the bore 12a. An end of an optical fiber (not shown) is disposed in the ferrule 12b and has an end face that is flush with the end of the ferrule 12b. The horizontal line 112 represents a core of the optical fiber, which is coaxial with the axis of the ferrule 12b and with the central axis of the bore 12a. When the LC optical connector 12 is mated with the receptacle 16 as shown in FIG. 13, the outer surface of the ferrule 12b is in contact with the inner surface of the flange 72 and the end of the ferrule 12b is in abutment with the base 72a of the flange 72. In this mated configuration, the end of the ferrule 12b and the axis 112 of the fiber are aligned in the X, Y and Z dimensions with the opening 50e (FIGS. 10 and 13) of the OSA 50 and with the optoelectronic device 45 of the ESA 40.

It can be seen in FIG. 13 that the module PCB 41 of the ESA 40 is perpendicular to the optical axis of the optical connector 10. Stated another way, a plane in which the back side 41b lies is perpendicular to the optical axis 112 of the fiber, which is coaxial with the optical axis of the optoelectronic device 45 and with the optical axis of the ferrule 12b. This allows the module 10 to be shorter in length, i.e., in the Z direction, than known SFP modules, but requires that a 90° electrical turn be made between the module PCB 41 and the motherboard PCB 30. The manner in which this is accomplished will now be described with reference to FIGS. 14A and 14B.

Figure 14A:
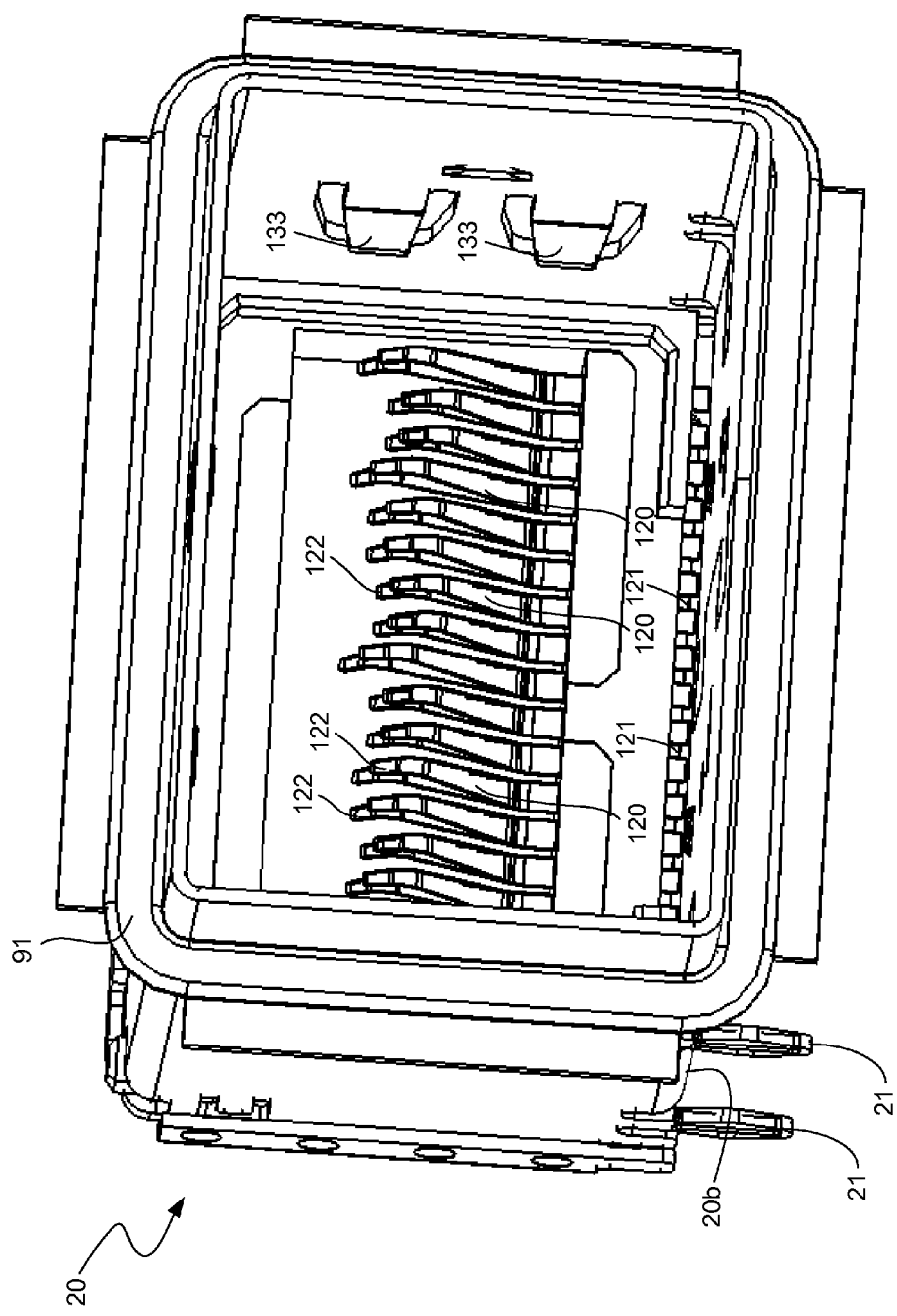
FIGS. 14A and 14B illustrate front perspective views of the cage shown in FIGS. 1-2B from slightly different angles.
Figure 14B:
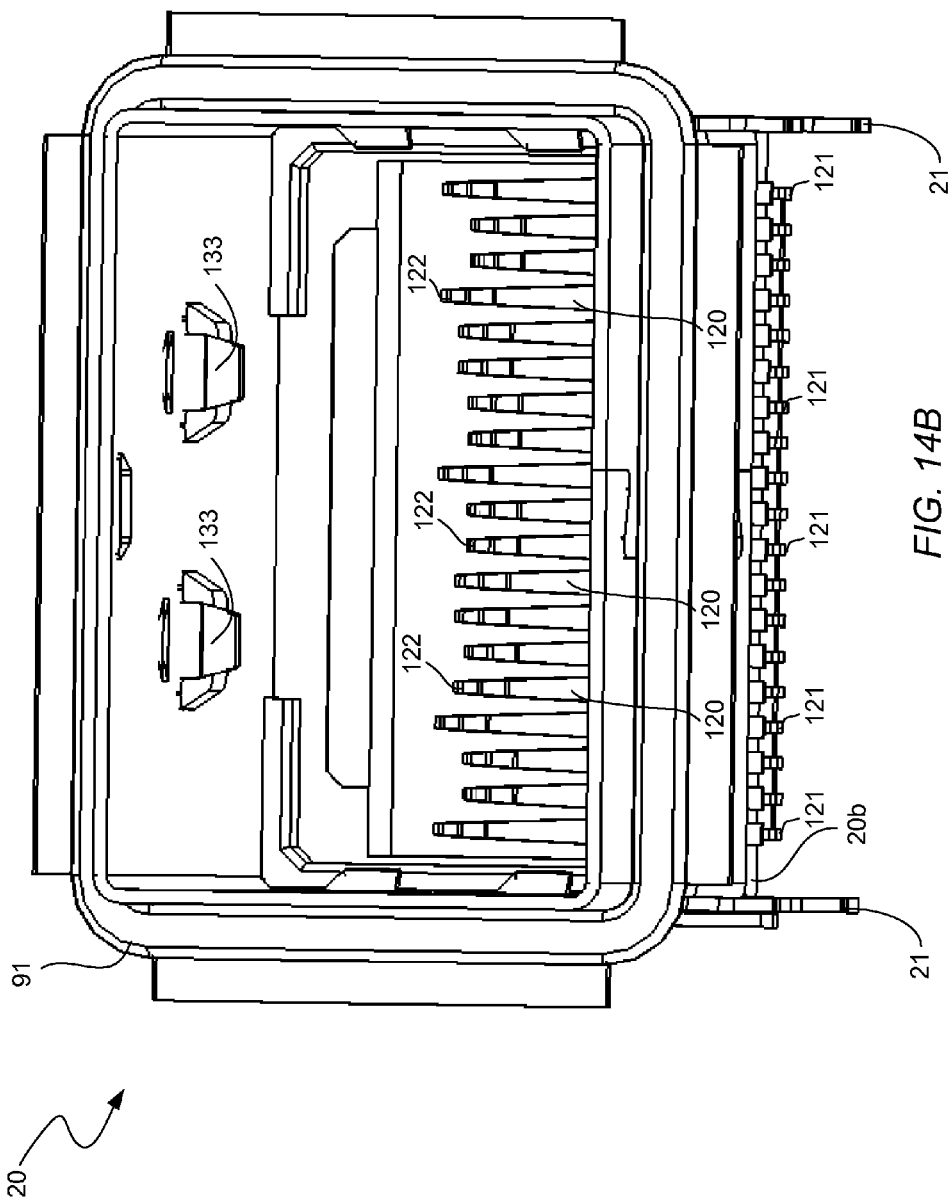

FIGS. 14A and 14B illustrate front perspective views of the cage 20 shown in FIGS. 1-2B from slightly different angles. The cage 20 has four snap connectors 21 disposed on a bottom surface 20b thereof that snap onto holes (not shown) of the motherboard PCB 30 to secure the cage 20 to the motherboard PCB 30. The cage 20 has a plurality of spring fingers 120 disposed at a back end thereof that provide an electrical interface that interfaces the module PCB 41 of the ESA 40 (FIG. 3B) to the motherboard PCB 30 of the optical communications system 1 (FIG. 1). The spring fingers 120 have proximal ends 121 (FIGS. 2B and 14B) that are in contact with respective electrical contacts 130 (FIG. 2B) disposed on the upper surface 30a of the mother board PCB 30. Distal ends 122 (FIGS. 2B, 14A and 14B) of the spring fingers 120 are disposed inside of the cage 120 near the back end of the cage 20 for making contact with respective electrically-conductive contact pads 52 (FIG. 3B) disposed on the back side 41b of the module PCB 41 when the module 10 is mated with the cage 20 (FIGS. 1-2B).

The spring fingers 120 are bent at locations in between their proximal and distal ends 121 and 122 to provide them with spring characteristics. The spring characteristics are needed to ensure that their distal ends 122 press against the respective contact pads 48 (FIG. 3B) of the module PCB 41 with a predetermined amount of force needed to ensure that proper electrical connections are made and maintained while the module 10 is installed in the cage 20. There are three different lengths of spring fingers 120 and three different angles of bend. The different lengths and bend angles ensure that the spring fingers 120 establish their corresponding electrical connections in a particular sequence: electrical ground connections are made first in the sequence; electrical power connections are made second in the sequence; and electrical signal connections are made last in the sequence. This sequencing feature provides the module 10 with hot pluggability, meaning that the electrical connections can be made between the module 10 and the system 1 upon mating the module 10 with the cage 20 while the power to system 1 is already turned on.

The different lengths and bend angles cause the distal ends 122 to be positioned at different respective distances from the respective contact pads 48 of the module PCB 41 such that the distal ends 122 make contact with the respective contact pads 48 at different respective instances of time during the process of plugging the module 10 into the cage 20. Also, the different bend angles allow the spring fingers 120 that make electrical connections earlier in the sequence to be deformed to a greater extent than the spring fingers 120 that make electrical connections later in the sequence without becoming permanently deformed. The different lengths and bend angles are visible in FIGS. 2B, 14A and 14B.

Figure 15:
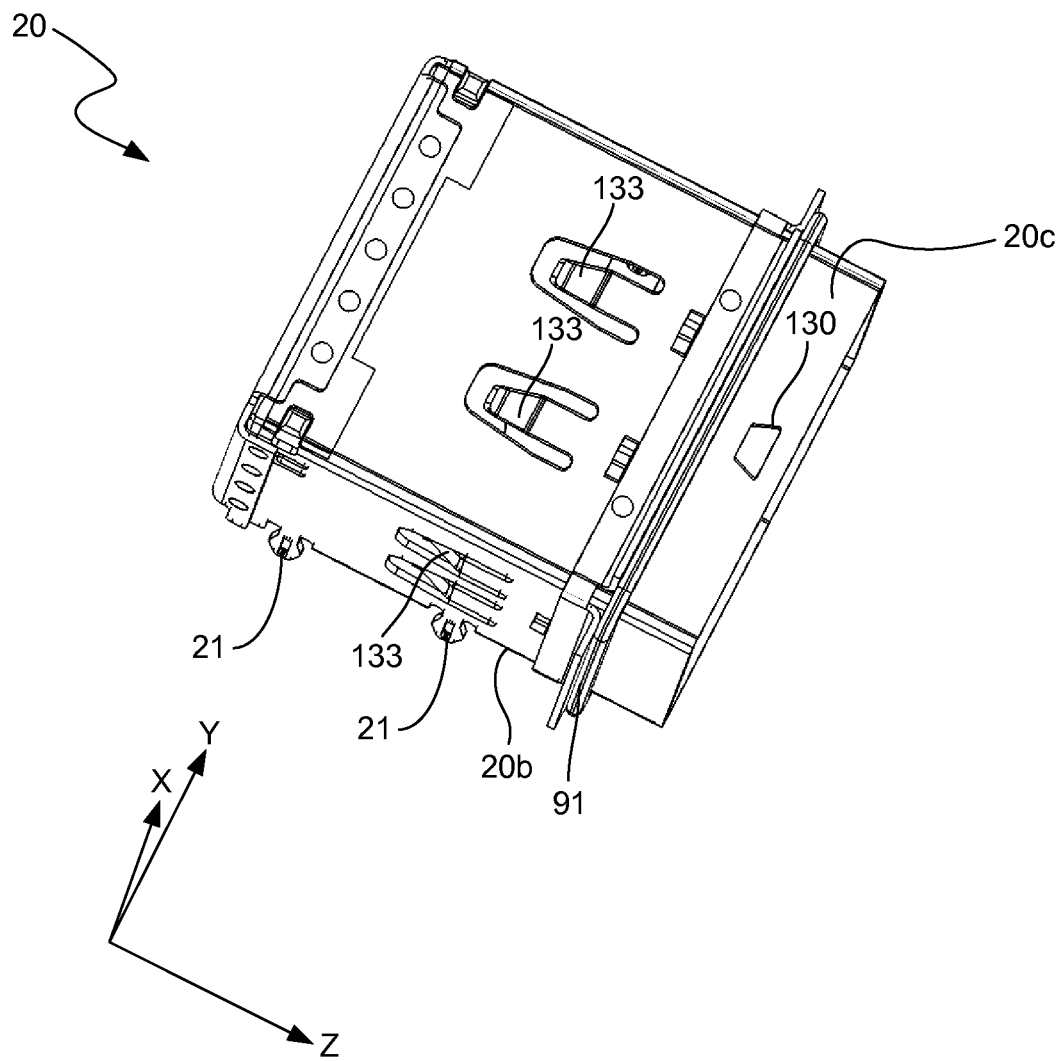
FIG. 15 illustrates a top perspective view of the cage shown in FIGS. 14A and 14B.

FIG. 15 illustrates a top perspective view of the cage 20 shown in FIGS. 14A and 14B. The cage 20 has a hole 130 disposed in a top side 20c thereof proximate the cage opening for receiving a latch 131 (FIGS. 3A-5) when the module 10 is mated with the cage 20. The hole 130 (FIG. 15) and the latch 131 together make up the latching/delatching mechanism for latching/delatching the module 10 with and from the cage 20. As indicated above, the module body 10a is typically made of a hard plastic material such as molded plastic, for example. As indicated above, the latch 131 is seated at the end of a beam 132 (FIGS. 3A and 4) and molded as part of the module body 10a. A small gap 133 (FIGS. 3A and 4) exists between the beam and the major part of the module body 10a. As the module 10 is being inserted into the cage opening, the beam 132 deflects downward (X dimension) allowing the module 10 to move into the cage 20. When the latch 131 is aligned with the hole 130, the latch 131 snaps into the hole 130. When the insertion force pushing the module 10 into the cage 20 is released, the back surface of latch 131 will be pushed against the back surface of the hole 130 by the spring forces of the spring fingers 120. In order to delatch the module 10 from the cage 20, a user presses a sharp tool against the latch 131 in the −X direction to deflect the beam 132 in the −X direction until the latch 131 is no longer engaged with the hole 130. The user can then extract the module 10 from the cage 20.

One of the benefits of the latching/delatching mechanism 130/131 is that the beam 132 in the body 10a rather than the cage 20 is deformed to remove the module 10 from the cage 20. In contrast, with the known delatching mechanism described above, the cage is temporarily deformed to delatch, or disengage, the cage from the module body. Because some movement of the cage occurs to delatch the module body from the cage, some additional space is needed for the cages. Because the beam 132 of the module body 10a rather than the cage 20 is deformed during the delatching operation, no additional space is needed to allow for movement of the cage. This, in turn, allows mounting density of the cages 20 and modules 10 to be increased, which allows information bandwidth to be increased. Another advantage of the latching/delatching mechanism 130/131 is that it is relatively inexpensive to implement compared to the known latching/delatching mechanism.

The cage 20 also has springs 133 formed in the top and sides of the cage 20 that are directed inwardly toward the interior of the cage 20. When the module 10 is in its mated position within the cage 20, as shown in FIGS. 1-2B, the springs 133 and the EMI shield 60 are in contact with one another and exert forces against one another. This contact between the springs 133 and the EMI shield 60 ensure that continual contact is made between the cage 20 and the EMI shield 60.

The illustrative embodiment of the optical communications module 10 described above is an optical transceiver module having a single transmit channel for transmitting optical signals produced by the optoelectronic device 45 and a single receive channel for receiving optical signals with the optoelectronic device 44. It should be noted, however, that the optical communications module of the present invention may have any number of transmit and/or receive channels. It should also be noted that while the optical communications system 1 (FIGS. 1-2B) has been described as having a single optical communications module 10, the optical communications system 1 may have multiple optical communications modules 10 mounted on the same motherboard PCB 30 or on different PCBs (not shown). For example, multiple modules 10 may be stacked and/or placed side-by-side on the same or on different PCBs.

Also, in some embodiments the cage 20 may be eliminated and the module 10 can be mounted directly on the motherboard PCB 30 such that the back side 41b of the module PCB 41 is in contact with the upper surface 30a of the motherboard PCB 30 (FIG. 1) and contact pads 48 (FIG. 3B) of the module PCB 41 are in direct contact with respective electrical contacts (not shown) of the motherboard PCB 30. It should be noted that in such a embodiment there is still no optical turn.

Also, while the optical communications module 10 is shown as having first and second receptacles 15 and 16 for mating with first and second optical connectors 11 and 12, respectively, the module 10 has N receptacles for mating with N optical connectors, where N is a positive integer that is equal to or greater than 1. Likewise, the ESA 40 has N optoelectronic devices.

Figure 16:
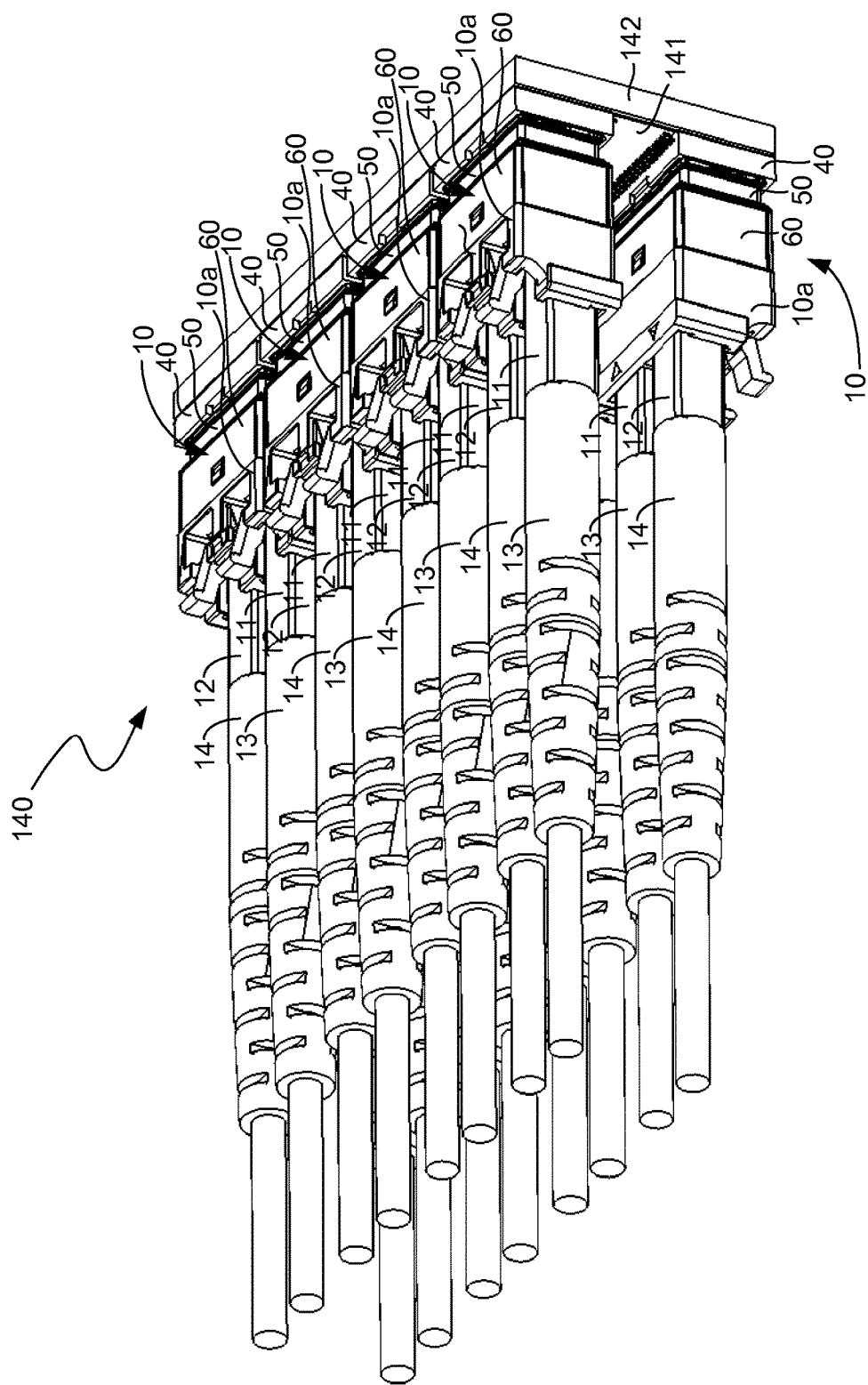
FIG. 16 illustrates a perspective view of a two-by-four array of the optical communications module shown in FIGS. 3A and 3B mounted on a socket board.

FIG. 16 illustrates a perspective view of a two-by-four array 140 of stacked optical communications modules 10 in accordance with another illustrative embodiment. Unlike the optical communications system 1 shown in FIGS. 1 and 2A, the ESAs 40 of the modules 10 shown in FIG. 16 are parallel to the circuit board 141 on which the modules 10 are mounted. In accordance with this illustrative embodiment, the circuit board 141 is a socket board having eight electrical sockets with arrays of electrical contacts (e.g., ball grid arrays or land grid arrays) for making contact with the electrical contacts of the PCBs 41 (not shown) of the ESAs 40. The socket board 141 is disposed on a structural support device 142 that provides structural support for the array 140. It should be noted that neither an electrical turn nor an optical turn is needed in this embodiment. It should also be noted that the cages 20 (FIG. 15) are not needed, which reduces costs and provides additional space for increased mounting density. The entire array 140 is typically housed in some other system housing, such as a sheet metal box (not shown), for example.

Figure 17:
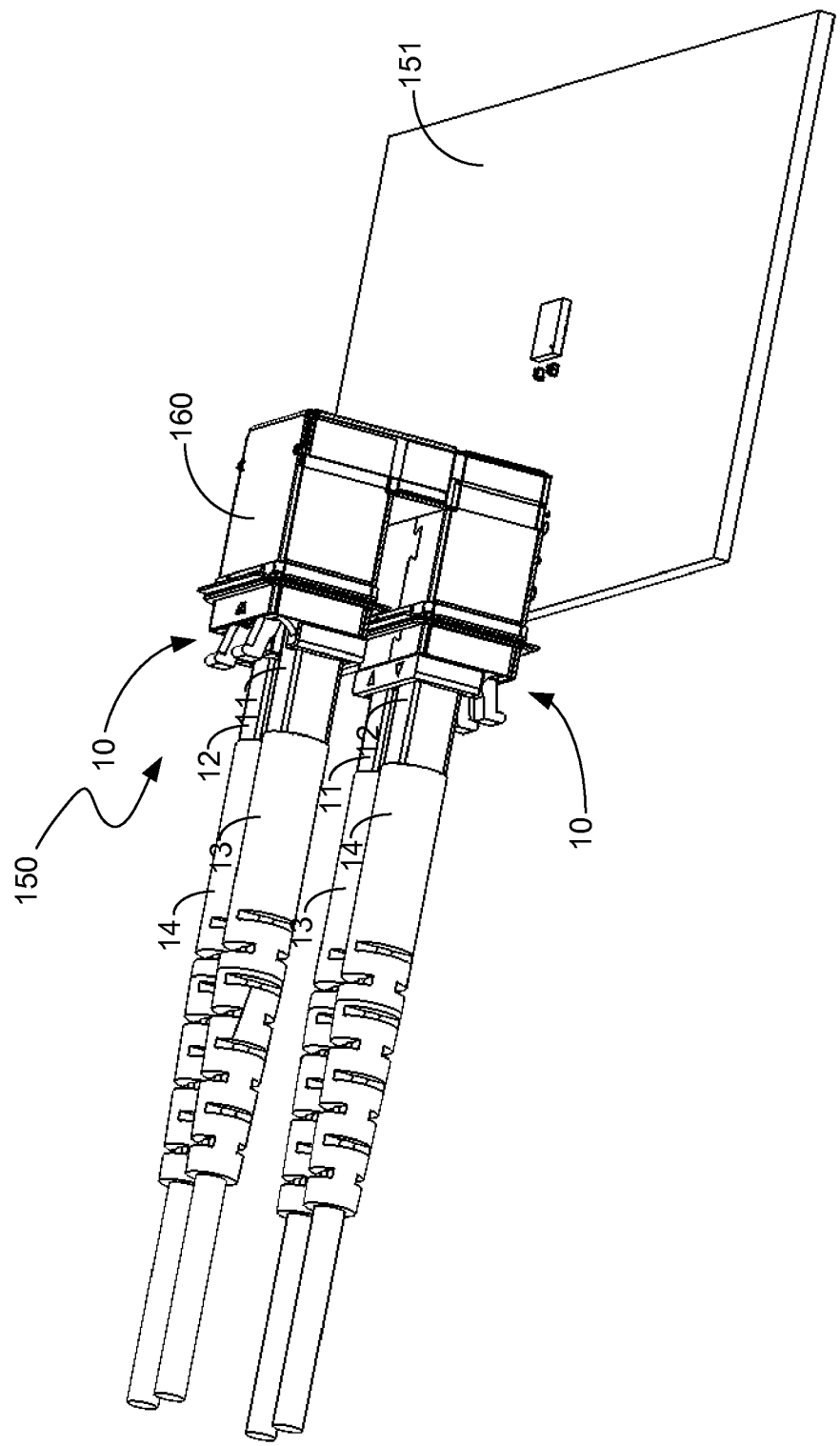
FIG. 17 illustrates a one-by-two stack of the optical communications module shown in FIGS. 3A and 3B installed in a double cage that is mounted on a system PCB.

FIG. 17 illustrates a one-by-two stack 150 of the optical communications modules 10 in accordance with another illustrative embodiment Like the optical communications system 1 shown in FIGS. 1 and 2A, the ESAs 40 shown in FIG. 17 are perpendicular to the system PCB 151. Thus, an electrical turn is made, but no optical turns are made. The stack 150 includes a double cage 160 for receiving the two modules 10. The back end of the double cage 160 has an electrical interface (not shown) for electrically interfacing the ESAs 40 (not shown) of the modules 10 with the system PCB 151.

It should be noted that the invention has been described with respect to illustrative embodiments for the purpose of describing the principles and concepts of the invention. The invention is not limited to these embodiments. For example, while the invention has been described with reference to a particular optical communications system and module configuration, the principles and concepts of the invention apply to other optical communications system and module configurations. As will be understood by those skilled in the art in view of the description being provided herein, many modifications may be made to the embodiments described herein while still achieving the goals of the invention, and all such modifications are within the scope of the invention.

What is claimed is:

1. An optical communications system comprising:
    a first pluggable optical communications module, the module comprising:
        a plastic module body having at least a first receptacle formed in a front end thereof for mating with a first optical connector that holds a first end of a first optical fiber, the first receptacle having an axis that is coaxial with an optical axis of the first optical connector when the first optical connector is mated with the first receptacle;
        an optical subassembly (OSA); and
        an electrical subassembly (ESA), wherein at least a first optoelectronic device of the ESA has an optical axis that is coaxial with the axis of the first receptacle such that when the first optical connector is mated with the first receptacle, the optical axis of the first optoelectronic device is coaxial with the optical axis of the first optical connector.

2. An optical communications system of claim 1, wherein the module body has at least a first receptacle formed in a back side thereof in alignment with the first receptacle formed in the front end thereof and wherein the system further comprises:
    an electromagnetic interference (EMI) shield secured to a back portion of the module body and to the OSA, the EMI shield having a first receptacle formed therein that is aligned with the first receptacle formed in the back side of the module body, and wherein the OSA is secured to a back side of the EMI shield and the ESA is secured to a back side of the OSA, wherein the OSA has a first flange that passes through the first receptacle formed in the EMI shield and through the first receptacle formed in the back side of the module body such that at least a portion of the first flange extends a distance into an interior space of the module body for mating with a front end of the first optical connector.

3. The optical communications system of claim 2, wherein in addition to the back side of the EMI shield, the EMI shield has a top side, a bottom side, a right side, and a left side, the top and bottom sides of the EMI shield being in contact with top and bottom sides, respectively, of the module body, the right and left sides of the EMI shield being in contact with right and left sides, respectively, of the module body, the back side of the EMI shield being in contact with the back side of the module body, wherein the first receptacle formed in the EMI shield is formed in the back side of the EMI shield.

4. The optical communications system of claim 3, wherein the OSA is made of molded plastic and wherein the first flange is made of a metallic material, the first flange has a proximal end that is fixedly secured to the OSA and a distal end that has an opening formed therein for mating with a ferrule of the first optical connector.

5. The optical communications system of claim 4, wherein inner surfaces of the top, bottom, left and right sides of the EMI shield are in contact with the top, bottom, left and right sides of the module body, respectively.

6. The optical communications module of claim 3, wherein the back side of the EMI shield has a plurality of perforations formed therein and wherein the back side of the module body has a plurality of studs disposed thereon that pass through respective perforations of the plurality of perforations, and wherein a front side of the OSA has blind holes formed therein that mate with ends of respective studs of the plurality of studs.

7. The optical communications system of claim 3, wherein one of the sides of the EMI shield has a first latch opening formed therein and wherein one of the sides of the module body that is adjacent the side of the EMI shield having the first latch opening formed therein has a first latch formed thereon that is shaped and sized to mate with the first latch opening when the EMI shield is pressed onto the back portion of the module body.

8. The optical communications system of claim 7, wherein the side of the EMI shield that is opposite the side of the EMI shield that has the first latch opening formed therein has a second latch opening formed therein and wherein the side of the module body that is opposite the side of the module body that has the first latch formed thereon has a second latch formed thereon that is shaped and sized to mate with the second latch opening when the EMI shield is pressed onto the back portion of the module body.

9. The optical communications system of claim 2, wherein the OSA has a molded plastic body and wherein the first flange is integrally formed in the molded plastic such that the first flange and the molded plastic body of the OSA are a unitary part.

10. The optical communications system of claim 2, wherein the ESA comprises a module printed circuit board (PCB) having a front side and a back side, the first optoelectronic device being mounted on the front side of the module PCB, the front side of the module PCB being perpendicular to the axis of the first receptacle of the EMI shield.

11. The optical communications system of claim 10, wherein the back side of the module PCB has a plurality of electrically-conductive contacts disposed thereon for electrically interfacing the module PCB with a motherboard PCB, the optical communications system further comprising:
    a system PCB, the system PCB having a plurality of electrical contact pads disposed on a first surface thereof; and
    a cage mounted on the system PCB, the cage being made of a metallic material, the cage having a front end, a back end, a top side, a bottom side, a left side and a right side, the cage having an electrical interface disposed at the back end of the cage, the optical communications module being mated with the cage such that the back side of the module PCB is electrically interconnected with the electrical interface, the electrical interface being electrically connected to the electrical contact pads of the system PCB.

12. The optical communications system of claim 11, wherein the electrical interface comprises a plurality of electrically-conductive spring fingers, each spring finger having a proximate end that is in contact with a respective electrical contact pad of the system PCB and having a distal end that is positioned relative to the back side of the module PCB to come into contact with a respective electrically-conductive contact disposed on the back side of the module PCB when the optical communications module is mated with the cage to establish respective electrical interconnections between the respective electrically-conductive contacts of the module PCB and the respective electrical contact pads of the system PCB.

13. The optical communications system of claim 12, wherein at least first and second spring fingers of the plurality of spring fingers have different lengths and different bend angles, and wherein the different lengths and bend angles are preselected to ensure that the first spring finger establishes the respective electrical interconnection before the second spring finger establishes the respective electrical interconnection.

14. The optical communications system of claim 11, wherein the back side of the module PCB lies in a plane that is perpendicular to the first surface of the system PCB.

15. The optical communications system of claim 11, wherein the EMI shield is in contact with the cage.

16. The optical communications system of claim 15, wherein the EMI shield has a top side, a bottom side, a right side, a left side, and a back side, wherein the top side, bottom side, left side and right side of the cage have respective springs formed thereon that are directed inwardly and press against the top side, the bottom side, the left side and the right side of the EMI shield, respectively, to ensure continual contact between the cage and the EMI shield.

17. The optical communications system of claim 11, wherein the optical communications module is a hot-pluggable optical communications module.

18. The optical communications system of claim 2, wherein the first receptacle formed in the front end of the plastic module body is configured to mate with an LC optical connector, and wherein the first flange is shaped and sized to mate with a ferrule of the LC optical connector when then LC optical connector is mated with the first receptacle formed in the front end of the plastic module body.

19. The optical communications system of claim 1, further comprising:
an optical fiber cable comprising the first optical fiber, the first end of the first optical fiber being held in the first optical connector, the first optical connector being mated with the first receptacle formed in the front end of the plastic module body; and
a second pluggable optical communications module, the second pluggable optical communications module comprising:
a second plastic module body having at least a second receptacle formed in a front end thereof that is mated with a second optical connector of the optical fiber cable, the second optical connector holding a second end of the first optical fiber, the second receptacle formed in the front end of the second plastic module body having an axis that is coaxial with an optical axis of the second optical connector when the second optical connector is mated with the second receptacle formed in the front end of the second plastic module body;
a second OSA; and
a second ESA, wherein at least a second optoelectronic device of the second ESA has an optical axis that is coaxial with the axis of the second receptacle formed in the front end of the second plastic module body such that when the second optical connector is mated with the second receptacle formed in the front end of the second plastic module body, the optical axis of the second optoelectronic device is coaxial with the optical axis of the second optical connector.

20. An optical communications module comprising:
a plastic module body, the module body having at least a first receptacle formed in a front end thereof for mating with a first optical connector that holds an end of a first optical fiber, the first receptacle having an axis that is coaxial with an optical axis of the first optical connector when the first optical connector is mated with the first receptacle, the module body having at least a first receptacle formed in a back side thereof in alignment with the first receptacle formed in the front end thereof;
an electromagnetic interference (EMI) shield connected to a back portion of the module body and having a top side, a bottom side, a left side, a right side, and a back side, the EMI shield having a first receptacle formed in the back side thereof that is aligned with the first receptacle opening formed in the back side of the module body, wherein the top, bottom, left and right sides of the EMI shield are in contact with top, bottom, left and right sides of the module body, respectively;
an optical subassembly (OSA) connected to the back side of the EMI shield, wherein a first metal flange of the OSA passes through the first receptacle formed in the EMI shield and through the first receptacle formed in the back side of the module body such that at least a portion of the first flange extends a distance into an interior space of the module body; and
an electrical subassembly (ESA) connected to a back side of the OSA.

21. The optical communications module of claim 20, wherein at least a first optoelectronic device of the ESA has an optical axis that is coaxial with the axis of the first receptacle formed in the front end of the module body, and wherein when the first optical connector is mated with the first receptacle formed in the front end of the module body, the optical axis of the first optoelectronic device is coaxial with the optical axis of the first optical connector, the OSA coupling light between the first optical connector and the first optoelectronic device.

22. An optical communications system comprising:
a first pluggable optical communications module, the module comprising:
a first plastic module body having at least a first receptacle formed in a front end thereof for mating with a first optical connector that holds a first end of a first optical fiber, the first receptacle having an axis that is coaxial with an optical axis of the first optical connector when the first optical connector is mated with the first receptacle;
a first optical subassembly (OSA); and
a first electrical subassembly (ESA), wherein at least a first optoelectronic device of the ESA has an optical axis that is coaxial with the axis of the first receptacle such that when the first optical connector is mated with the first receptacle, the optical axis of the first optoelectronic device is coaxial with the optical axis of the first optical connector; and a second pluggable optical communications module stacked above the first pluggable optical communications module, the second module comprising:
- a second plastic module body having at least a second receptacle formed in a front end thereof for mating with a second optical connector that holds a first end of a second optical fiber, the second receptacle having an axis that is coaxial with an optical axis of the second optical connector when the second optical connector is mated with the second receptacle;
- a second OSA; and
- a second ESA, wherein at least a second optoelectronic device of the second ESA has an optical axis that is coaxial with the axis of the second receptacle such that when the second optical connector is mated with the second receptacle, the optical axis of the second optoelectronic device is with the optical axis of the second optical connector.

* * * * *